United States Patent
Nagaoka et al.

(10) Patent No.: US 6,924,727 B2
(45) Date of Patent: Aug. 2, 2005

(54) METHOD FOR REMOTE CONTROL OF HOME-LOCATED ELECTRONIC DEVICES AND A MANAGEMENT FACILITY

(75) Inventors: Tatsuji Nagaoka, Sapporo (JP); Kazuo Nomura, Tokyo (JP); Yutaka Hiruma, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 373 days.

(21) Appl. No.: 10/129,583

(22) PCT Filed: Sep. 27, 2001

(86) PCT No.: PCT/JP01/08452

§ 371 (c)(1),
(2), (4) Date: May 3, 2002

(87) PCT Pub. No.: WO02/28083

PCT Pub. Date: Apr. 4, 2002

(65) Prior Publication Data

US 2002/0180579 A1 Dec. 5, 2002

(30) Foreign Application Priority Data

Sep. 27, 2000 (JP) .................................. 2000-295110

(51) Int. Cl.⁷ .......................... G05B 23/02; G05B 15/00
(52) U.S. Cl. ...................... 340/3.1; 340/3.43; 340/3.44; 700/83
(58) Field of Search ............................ 340/3.1, 3.43, 340/3.44, 506, 539.11, 539.14, 539.16, 539.19, 531; 700/11, 83

(56) References Cited

U.S. PATENT DOCUMENTS

| | | | |
|---|---|---|---|
| 5,629,687 A | 5/1997 | Sutton et al. | |
| 5,870,610 A | 2/1999 | Beyda | |
| 6,463,343 B1 * | 10/2002 | Emens et al. ................. | 700/83 |
| 6,553,336 B1 * | 4/2003 | Johnson et al. ............. | 702/188 |
| 6,580,950 B1 * | 6/2003 | Johnson et al. ............... | 700/83 |
| 6,587,046 B2 * | 7/2003 | Joao ....................... | 340/539.14 |
| 6,667,688 B1 * | 12/2003 | Menard et al. ............... | 340/3.1 |
| 6,686,838 B1 * | 2/2004 | Rezvani et al. .............. | 340/3.1 |
| 6,704,787 B1 * | 3/2004 | Umbreit ..................... | 340/512 |

FOREIGN PATENT DOCUMENTS

| | | | | |
|---|---|---|---|---|
| EP | 0 917 052 A1 | 5/1999 | | |
| GB | 2 230 163 A | 10/1990 | | |
| JP | 63292856 A | * 11/1988 | ............ | H04M/3/00 |
| JP | 63-292856 A | 11/1988 | | |
| JP | 8-097936 A | 4/1996 | | |
| JP | 08097936 A | * 4/1996 | .......... | H04M/11/04 |
| JP | 8-227491 A | 9/1996 | | |
| JP | 08227491 A | * 9/1996 | ........... | G08B/23/00 |
| WO | WO 98/53581 | 11/1998 | | |
| WO | WO 99/09780 | 2/1999 | | |
| WO | WO 99/65192 | 12/1999 | | |
| WO | WO 00/30297 | 5/2000 | | |
| WO | WO 00/36812 | 6/2000 | | |

OTHER PUBLICATIONS

Provisional U.S. Appl. No. 60/230,318 □□Provisional U.S. Appl. No. 60/187,735.*

* cited by examiner

Primary Examiner—Brian Zimmerman
Assistant Examiner—Clara Yang
(74) Attorney, Agent, or Firm—Brinks Hofer Gilson & Lione

(57) ABSTRACT

A security system 63 and an electronic device group 62 to be stored in a home network 6 are controlled by a home server 61. A home network management facility 5 obtains status information of the electronic device group 62 from home server 61. Home network management facility 5 displays the status of electronic device group 62 on a display unit of a terminal 1 based on the received status information. Home network management facility 5 also displays a screen for prompting input of a control instruction of the home-located electronic devices that are included in the electronic device group 62. Based on control instruction received via home server 61, home network management facility 5 performs remote control of electronic device group 62.

38 Claims, 26 Drawing Sheets

FIG. 3

TBL1-1

| SECURITY SYSTEM ||| 
|---|---|---|
| LOCK STATUS | OPERATION STATUS | LOCK LOG |
| ON | ON | HISTORY1 |
| | | HISTORY2 |
| | | ... |

TBL1-2

| VIDEO RECORDER |||||
|---|---|---|---|---|
| PRESETTING PROGRAM RECORDING1 | PRESETTING PROGRAM RECORDING2 | ... | AMOUNT OF AVAILABLE RECORDING TIME | RECORDING HISTORY |
| 8ch | 10ch | ... | 120 MINUTES | HISTORY1 |
| 2000/10/1 20:00~21:00 | 2000/10/10 22:00~23:00 | ... | | HISTORY2 |
| | | | | ... |

TBL1-3

| LIGHTING |||||||
|---|---|---|---|---|---|---|
| PORCH | LIVING | KITCHEN | JAPANESE ROOM | BEDROOM | TOILET | ... |
| ON | OFF | OFF | OFF | OFF | OFF | ... |

⋮

TBL1-K

| |
|---|
| |

FIG. 6

| USER ID | TERMINAL ID | HOME NETWORK ID | SECURITY LEVEL |
|---|---|---|---|
| user. a | MSa | home. a | LEVEL1 |
| user. b | MSb | home. b | LEVEL2 |
| ... | ... | ... | ... |

FIG. 7

| HOME NETWORK ID | STATUS INFORMATION | | | | | | | |
|---|---|---|---|---|---|---|---|---|
| | SECURITY SYSTEM | | | VIDEO RECORDER | | | | |
| | LOCK STATUS | OPERATION STATUS | LOCK LOG | | PRESETTING PROGRAM RECORDING 1 | PRESETTING PROGRAM RECORDING 2 | ... | AMOUNT OF AVAILABLE RECORDING TIME | RECORDING HISTORY | |
| | | | HISTORY 1 | HISTORY 2 | ... | | | | | | HISTORY 1 | HISTORY 2 | ... |
| home.a | ON | ON | | | | 8ch | 10ch | ... | 120 MINUTES | | | |
| | | | | | | 2000/10/1 20:00~21:00 | 2000/10/10 22:00~23:00 | | | | | |
| ... | | | | | | | | | | | | |

FIG. 8

| MODEL NAME OF TERMINAL | DISPLAY CAPABILITY LEVEL | COMMUNICATION CAPABILITY LEVEL | TERMINAL COMMUNICATION STANDARD |
|---|---|---|---|
| MODEL a | LEVEL 1 | LEVEL 1 | STANDARD 1 |
| MODEL b | LEVEL 2 | LEVEL 3 | STANDARD 2 |
| ... | ... | ... | ... |

FIG. 9

| USER ID | PASSWORD |
|---|---|
| user. a | × × × × × |
| user. b | △ △ △ △ △ |
| ... | ... |

FIG. 10

| HOME NETWORK ID | NETWORK COMMUNICATION STANDARD |
|---|---|
| home. a | STANDARD 1 |
| home. b | STANDARD 2 |
| ... | ... |

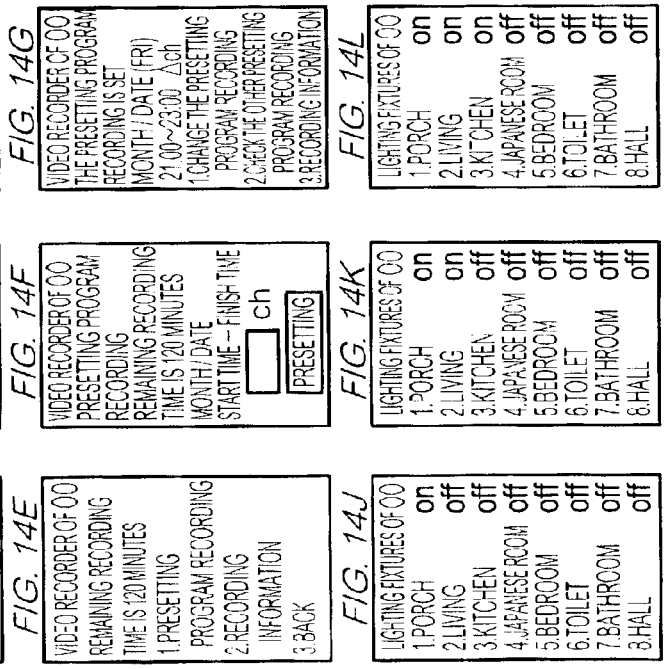

FIG. 15A
WELCOME TO ○○
1. SECURITY SYSTEM
2. VIDEO RECORDER
3. LIGHTING FIXTURES
4. REFRIGERATOR
5. AIR CONDITIONER
6. RICE COOKER
7. BATH
8. GAS CONTROL

FIG. 15B
REFRIGERATOR OF ○○
REFRIGERATOR TEMPERATURE 4°C
FREEZER TEMPERATURE -10°C
1. TEMPERATURE ADJUSTMENT
2. CHECK STOCK

FIG. 15C
REFRIGERATOR OF ○○
TEMPERATURE ADJUSTMENT
1. REFRIGERATOR
2. FREEZER
3. BACK

FIG. 15D
REFRIGERATOR OF ○○
TEMPERATURE ADJUSTMENT OF THE REFRIGERATOR
(4 DEGREES AT PRESENT)
INPUT THE TEMPERATURE
☐ °C

FIG. 15E
REFRIGERATOR OF ○○
STOCK OF THE REFRIGERATOR
EGG        4
MILK       2
SOFT DRINK 3
MEAT    200g
CABBAGE HALF

FIG. 15F
AIR CONDITIONER OF ○○
THE AIR CONDITIONER IS OFF AT PRESENT
ROOM
TEMPERATURE 28°C
HUMIDITY 80%
1. COOLER CONTROL
2. HEATER CONTROL
3. HUMIDITY CONTROL

FIG. 15G
THE COOLER CONTROL OF ○○
(ROOM TEMPERATURE 28°C)
DESIRED TEMPERATURE
☐ °C  CHANGE

FIG. 15H
THE COOLER OF ○○ IS SET AT 24°C
ROOM
TEMPERATURE 28°C
HUMIDITY 80%
1. COOLER CONTROL
2. HEATER CONTROL
3. HUMIDITY CONTROL

FIG. 15I
RICE COOKER OF ○○
THREE CUPS OF RICE ARE IN THE RICE COOKER AT PRESENT
1. START COOKING
2. RESERVE COOKING

FIG. 15J
RICE COOKER OF ○○
SELECT HOW THE RICE WOULD LIKE TO BE COOKED
1. NORMAL (ABOUT 1 HOUR)
2. SHORT TIME (ABOUT 40 MINUTES)
3. RICE GRUEL
4. BACK

FIG. 15K
RICE COOKER OF ○○
COOKING TIMER
SELECT WHAT TIME YOU WOULD LIKE THE RICE TO BE COOKED
TIME: ☐:☐   SELECT

FIG. 15L
RICE COOKER OF ○○
COOKING TIMER
TIME ○:○
THE RICE WILL BE COOKED AT ○:△
DONENESS OF THE RICE: RICE GRUEL
BACK

FIG. 16A
WELCOME TO ○○
1. SECURITY SYSTEM
2. VIDEO RECORDER
3. LIGHTING FIXTURES
4. REFRIGERATOR
5. AIR CONDITIONER
6. RICE COOKER
7. BATH
8. GAS CONTROL

FIG. 16B
BATH OF ○○
THERE IS NO HOT WATER AT PRESENT
1. RUN THE BATH
2. BACK

FIG. 16C
BATH OF ○○
DESIGNATE BATH TIME AND TEMPERATURE
TIME: ☐:☐
☐ °C

FIG. 16D
BATH OF ○○
THE BATH TIME IS SET AT ●:△, AND THE TEMPERATURE IS SET AT 40 °C
BACK

FIG. 16E
GAS OF ○○
THE GAS IS ON AT PRESENT
1. TURN OFF GAS VALVE
2. TURN OFF

FIG. 20A
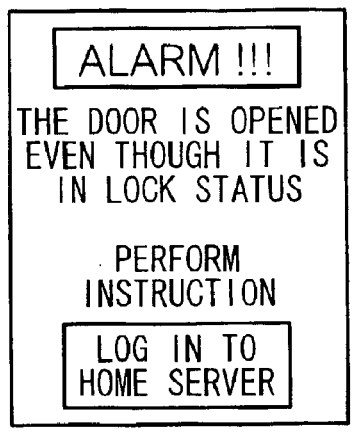
FIG. 20B
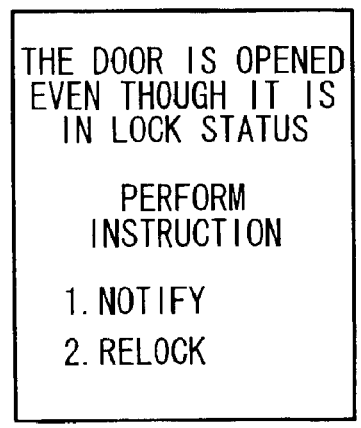
FIG. 21
| USER ID | TERMINAL ID | HOME NETWORK ID | SECURITY LEVEL |
|---------|-------------|-----------------|----------------|
| user. a | MSa | home. a | LEVEL1 |
|         |     | home. b | LEVEL2 |

| MODEL NAME | DRIVER |
|---|---|
| MODEL OF ELECTRONIC DEVICE a | DRIVER 1 |
| MODEL OF ELECTRONIC DEVICE b | DRIVER 2 |
| ... | ... |

FIG. 26

TBL2-1

| SECURITY SYSTEM | | |
|---|---|---|
| LOCK STATUS | OPERATION STATUS | LOCK LOG |
| ON | ON | HISTORY1 |
| | | HISTORY2 |
| | | ... |

TBL2-2

| AIR CONDITIONER | | | | |
|---|---|---|---|---|
| POWER SUPPLY | CAR ENVIRONMENT | SETTING TEMPERATURE | SETTING | TIMER |
| OFF | TEMPERATURE 33°C | 25°C | COOLER | ON |
| | HUMIDITY 50% | | | OFF |

TBL2-3

| LIGHT | | | | | | |
|---|---|---|---|---|---|---|
| HEAD-LIGHT | TAIL-LIGHT | FRONT FOG | REAR FOG | ROOM LIGHT | READING LIGHT | WINKER |
| ON | OFF | OFF | OFF | OFF | OFF | OFF |

⋮

TBL2-4

| GPS |
|---|
| POSITIONAL INFORMATION |
| NORTH LONGITUDE:36°　　EAST LONGITUDE:50° |

⋮

FIG. 27A
WELCOME TO CAR OF ~
1. SECURITY SYSTEM
2. AIR CONDITIONER
3. LIGHT
4. AUDIO
5. KEY CONTROL UNIT
6. ENGINE CONTROL UNIT

FIG. 27B
THE SECURITY SYSTEM IS OFF AT PRESENT
1. SECURITY SYSTEM ON
2. CHECK LOCK LOG

FIG. 27C
THE SECURITY SYSTEM IS SWITCHED ON
1. CHECK LOCK LOG
2. BACK

FIG. 27D
LOCK LOG
13:00 UNLOCK
15:35 LOCK
16:00 UNLOCK
1. THE SECURITY SYSTEM OFF
2. BACK

FIG. 27E
THE AIR CONDITIONER IS OFF AT PRESENT
ROOM TEMPERATURE 28°C
HUMIDITY 80%
1. COOLER CONTROL
2. HEATER CONTROL
3. HUMIDITY CONTROL

FIG. 27F
COOLER CONTROL
(ROOM TEMPERATURE 28°C)
DESIRED TEMPERATURE [ ] °C  [CHANGE]

FIG. 27G
THE COOLER IN CAR IS SET AT 24°C
ROOM TEMPERATURE 28°C
HUMIDITY 80%
1. COOLER CONTROL
2. HEATER CONTROL
3. HUMIDITY CONTROL

FIG. 27H
LIGHT
1. HEADLIGHT on
2. SIDELIGHT off
3. WINKER off
4. DOME LIGHT off

FIG. 27I
LIGHT
1. HEADLIGHT on
2. SIDELIGHT on
3. WINKER off
4. DOME LIGHT off

FIG. 27J
LIGHT
1. HEADLIGHT on
2. SIDELIGHT off
3. WINKER on
4. DOME LIGHT off

FIG. 27K
LIGHT
1. HEADLIGHT on
2. SIDELIGHT off
3. WINKER off
4. DOME LIGHT on

FIG. 28A

WELCOME TO
CAR OF~~
1. SECURITY SYSTEM
2. AIR CONDITIONER
3. LIGHT
4. AUDIO
5. KEY CONTROL UNIT
6. ENGINE CONTROL UNIT

FIG. 28B

KEY CONTROL UNIT

THE KEY IS OFF AT PRESENT

1. KEY ON
2. CHECK LOCK LOG

FIG. 28C

THE AIR CONDITIONER IS ON

1. THE ENGINE OFF
2. BACK

FIG. 28D

THE ENGINE IS SWITCHED OFF

LOGGED OFF

FIG. 28E

GPS
THE PRESENT VEHICLE POSITION IS AT
NORTH LONGITUDE
~~~~
EAST LONGITUDE
~~~~
1. DISPLAY MAP
2. BACK

*FIG. 30A*

RECEIVE
SENDER: car@~~
~~~~
VEHICLE ALARM
TRESPASS HAS
OCCURRED IN
YOUR VEHICLE

LOG IN TO
CAR SERVER

*FIG. 30B*

LOG IN TO CAR
SERVER

ID

PASSWORD

*FIG. 30C*

THE VEHICLE OF
~~ IS POSSIBLY
STOLEN
1. SECURITY
   SYSTEM
2. CHECK POSITIONAL
   INFORMATION
3. COMPULSORY
   ENGINE LOCK
4. NOTIFY THE POLICE

*FIG. 30D*

VEHICLE POSITION
THE VEHICLE IS MOVING
TOWARD NORTH AT
NORTH LONGITUDE~~~~
EAST LONGITUDE~~~~
1. DISPLAY MAP
2. COMPULSORY
   ENGINE LOCK
3. NOTIFY THE
   POLICE

*FIG. 30E*

THE ENGINE OF
THE VEHICLE
IS LOCKED
THE FINAL POSITION
OF THE VEHICLE IS AT
NORTH LONGITUDE~~~~
EAST LONGITUDE~~~~
1. DISPLAY MAP
2. NOTIFY
   THE POLICE

*FIG. 31A*

RECEIVE
SENDER: car@~~
~~~~
VEHICLE ALARM

THE LIGHT IS ON

LOG IN TO
CAR SERVER

*FIG. 31B*

LOG IN TO CAR
SERVER

ID

PASSWORD

METHOD FOR REMOTE CONTROL OF HOME-LOCATED ELECTRONIC DEVICES AND A MANAGEMENT FACILITY

TECHNICAL FIELD

The present invention relates to a method for remote control of home-located electronic devices, and a management facility.

ART BACKGROUND

A variety of home-located electronic devices such as, televisions, video recorders, air conditioners, microwave ovens, washing machines, and personal computers (PCs) are currently being used in the home. While such devices are frequently used independently, due to the lack of a common user interface, they are rarely used in conjunction with each other.

Obviously, if such devices could be controlled using a common user interface and also collectively managed, their ease and range of use could be greatly enhanced.

There are known several different methods for controlling household home-located electronic devices. In one method, a home server is provided. This server is used to control a home network, which is used in turn to control household home-located electronic devices.

By utilizing such a system, it has been proposed to remotely control household home-located electronic devices via a remote control means installed in a house. In this way, a user is able to obtain status information on home-located electronic devices in a house, and to control their function from a location remote from the house. In particular, the following three methods are known for use in systems comprising a home network having a remote control function.

(1) Remote Control Method (a)

The remote control method (a) is a home network comprising a home server which is continuously connected to the Internet. A user controls the home-located electronic devices in a house by communicating with the home server via the Internet from a portable telephone comprising a function of the Internet connection, a portable terminal, such as PHS (Personal Handyphone System) or other terminals, such as a notebook PC.

(2) Remote Control Method (b)

The remote control method (b) is a home network also comprising a home server which has a remote connection function, for example, RAS (Remote Access Service) in Windows (Registered Trademark) of the home server. A user performs a dial-up connection to the home server from the terminal of a notebook PC or the like, to thereby control home-located electronic devices in a house.

(3) Remote Control Method (c)

The remote control method (c) is a method by which to control home-located electronic devices in a house by utilizing a telephone, such as a pay phone, a portable telephone or a PC which can perform the function of transmitting a DTMF (Dial Tone Multi Frequency) signal. A user connects to the home server via a telephone line. The connected home server performs voice guidance with regard to the control of the home-located electronic devices. In accordance with the voice guidance, the user transmits the DTMF signal from the telephone, and performs the remote control operation of the home-located electronic devices.

The above-described methods for remote control of home-located electronic devices are subject to some limitations and disadvantages.

In remote control method (a), the home server has to be connected to the Internet all of the time and the cost of running is consequently high.

In remote control method (b), the home server does not have to be connected to the Internet all the time and is more economical to run.

However, there are other restrictions when using remote control method (b) in that a portable terminal such as a portable telephone has a function, at best, of being able to connect to the Internet and it is not compatible with a remote connection function installed in the home server, such as a RAS. Therefore, the user is not able to perform communication with regard to the remote connection function. Also, when a remote control function is installed in a portable phone, there is a problem that the portable phone becomes less portable since compatible software needs to be installed.

This drawback or restriction does not exist in remote control method (c), where the user is able to access the home server by utilizing a compact and lightweight portable terminal such as a portable telephone, and performs the remote control operation by following voice guidance provided by the home server. However, it is time consuming for the user to perform the remote control operation in accordance with voice guidance received from the home server, and consequently it is not possible to obtain detailed information on the status of the home-located electronic devices.

Further, in each of the remote control methods (a) (b) and (c), the home server provided in a house is required to perform multiple tasks, parallely and sequentially, such as, controlling the home-located electronic devices according to control instructions received from the user; transmitting the status of the home-located electronic devices to the user's terminal; based on the status information of the home-located electronic devices prompting the user to give the home server necessary control instructions; and receiving the control instructions from the terminal. Therefore, a high level of process capability is required, in order for the home server to perform the necessary multiple operations, which consequently results in high operating costs.

Thus, due to high running costs, and the technical limitations of the prior art, the wide spread use of remote control of home-located electronic devices cannot be achieved with the existing systems.

DISCLOSURE OF INVENTION

The present invention has been made with a view to providing an improved method for the remote control of home-located electronic devices and a management facility. The present invention utilizes a simple server to control home-located electronic devices which does not require a high level of process capability. In addition, the present invention utilizes a simple terminal (e.g. a portable telephone), for performing the remote control of the home-located electronic devices.

The present invention provides a method for remote control of home-located electronic devices. When a management facility receives a request signal and a first identifying signal from a terminal via a network, the management facility obtains status information showing status of home-located electronic devices controlled by a server. When the management server receives, a second identifying signal via the network from the server corresponding to the received first identifying signal, the management server generates a screen showing the status of the home-located electronic devices and display information showing a screen for prompting for input of a control instruction for the home-located electronic devices based on the status information.

The management server transmits the screens to the terminal corresponding to the second identifying signal. The terminal displays a screen showing the status of the home-located electronic devices and a screen prompting for input of a control instruction of the home-located electronic devices based on the received display information on the display screen, and transmits the first identifying signal and first control information that includes a control instruction to the management facility when the control instruction is input. The management facility generates second control information, for which the server performs control of the home-located electronic devices, based on the first control information, and transmits it to the server corresponding to the first identifying signal. The server then performs control of the home-located electronic devices, based on the second control information.

In the method for the remote control of home-located electronic devices of the present invention, the management facility obtains the status of the home-located electronic devices from the server when it receives a request from the terminal, receives the details for controlling the home-located electronic devices from the terminal based on the obtained status information, and transmits the details to the server. Thus, remote control of home-located electronic devices can be performed by utilizing a simple server, which has the advantage that large processing power is not required. Further, a simple terminal, such as a portable telephone can be used.

Following are summary descriptions of preferred embodiments of the present invention.

The management facility generates the display information depending upon performance of the terminal corresponding to the second identifying signal.

The management facility generates the display information depending upon communication capability of the terminal corresponding to the second identifying signal.

The management facility modifies the size of a picture, a number of display colors, a number of gradations, and data format for the display information depending upon display capability of the terminal corresponding to the second identifying signal.

The management facility generates the display information to be the same layout of information details displayed on the screen at the time of generating the display information between terminals which perform differently.

The first identifying signal and the second identifying signal are the same signals.

The management facility generates the display information based on either one of at least a user's age or sex.

The server is able to control one or more control items of one home-located electronic device, or of more than one home-located electronic devices. The management facility memorizes user security levels that indicate the beginning and ending of a range of home-located electronic devices that the user is permitted to control. Based on the security level of a user, the management facility excludes from the display the information for prompting the user to input a control instruction of the home-located electronic devices, and the information with regard to the control items, that are out of the range of the user's security level.

The management facility configures the security level based on the user's age.

The server and home-located electronic devices are installed in a house used by the user, and configured in a local network in the house.

The server and home-located electronic devices are installed in vehicles used by the user, and configures a local network in the vehicles.

An engine control unit for controlling the amount either one of at least gasoline or air supplied to an engine of vehicles is included in the home-located electronic devices. The server controls the engine control unit to control the amount of at least one of gasoline or air supplied to the engine of the vehicles based on the second control information.

A location information unit for obtaining location information of vehicles is included in the home-located electronic devices. The server controls the location information unit for obtaining the location information of the vehicles based on the second control information.

The management facility transmits the second control information, and charges the user when the server transmits a notification that designated control is performed by second control information.

The management facility transmits the second control information to the server via a mobile communication network.

The management facility is connected to the mobile communication network. The terminal transmits first control information to the management facility via the mobile communication network.

Further, the present invention provides a method for remote control of the home-located electronic devices that when the home-located electronic devices detect that an object is in designated status for detection, the home-located electronic devices transmit an emergency signal to a server via a local network. When the server receives the emergency signal, the server transmits an alarm showing an emergency and a first identifying signal to the management facility via the local network. When the management facility receives the alarm, the management facility generates a screen for performing alarm notification, and displays information prompting input of a control instruction for the home-located electronic devices based on the alarm. The screen and information is, transmitted to the terminal corresponding to the first identifying signal. When the terminal displays the screen for performing alarm notification and the screen for prompting input of the control instruction for the home-located electronic devices on the display screen based on the received display information, and when the control instruction is input, the terminal transmits the second identifying signal and the first control information showing the first control information to the management facility. The management facility generates the second control information, for which the server controls the home-located electronic devices, based on the first control information, and transmits it to the server corresponding to the second identifying signal. The server performs control of the home-located electronic devices based on the second control information.

Also, in another preferred embodiment, the management facility is connected with an emergency notification place via a network. The management facility notifies to the emergency notification place based on the second control information. The display information includes information showing a screen for prompting to notify to the emergency notification place.

In a further preferred embodiment, the first identifying signal and the second identifying signal are the same signals.

Also, the present invention provides a method for remote control of home-located electronic devices wherein a management facility comprises driver software for the server for performing control of home-located electronic devices controlled by a server connected to the management facility via network. The terminal transmits to the management facility, a request signal showing that the driver software is downloaded from the management facility by the server and an identifying signal. The management facility transmits to the server corresponding to the identifying signal, the driver software corresponding to the request signal.

Also, the present invention provides a management facility of the home-located electronic devices comprising a first communication unit for communicating with a terminal, a second communication unit for communicating with a server for performing control of home-located electronic devices, and a control unit. When the control unit receives a request signal and a first identifying signal from the terminal via the first communication unit, the control unit obtains status information showing the status of the home-located electronic devices controlled by the server. When the control unit receives a second identifying signal from the server corresponding to the first identifying signal via the second communication unit, the control unit generates a screen for showing status of the home-located electronic devices and display information for prompting input of a control instruction of the home-located electronic devices based on the status information. The control unit transmits the screen and display information to the terminal corresponding to the second identifying signal via the first communication unit. The terminal generates second control information, for which the server controls the home-located electronic devices, based on the first control information, and transmits it to the server corresponding to the received first identifying signal via the second communication unit.

Also, in another preferred embodiment, the control unit generates the display information by web page including a link to a page including more detailed information than a page for prompting the user to input a control instruction displayed on the displays unit.

Also, the present invention provides a management facility of the home-located electronic devices comprising a first communication unit for communicating with a terminal, a second communication unit for communicating with a server for performing control of home-located electronic devices, and a control unit. When the control unit receives a first identifying signal and an alarm from the server via the second communication unit, the control unit generates a screen for performing alarm notification and display information showing a screen for prompting input of a control instruction of the home-located electronic devices based on the received alarm. The control unit transmits the screens to the terminal corresponding to the first identifying signal via the first communication unit. When the control unit receives a second identifying signal and first control information showing the control instruction from the terminal via the first communication unit, the control unit generates second control information. The server performs control of the home-located electronic devices, based on the first control information, and transmits it to the server corresponding to the second identifying signal via the second communication unit.

Also, the present invention provides a management facility of the home-located electronic devices comprising a first communication unit for communicating with a terminal, a second communication unit for communicating with a server for performing control of home-located electronic devices, a memory unit, and a control unit. The memory unit comprises driver software for the server for performing control of home-located electronic devices controlled by the server connected to the management facility via the network. The control unit receives from the management facility via the first communication unit, an identifying signal and a request signal showing that the driver software is downloaded from the management facility by the server. The control unit transmits to the server corresponding to the identifying signal via a second communication unit, the driver software corresponding to the request signal.

BRIEF DESCRIPTION OF THE DRAWINGS

FIG. 3 is a diagram illustrating the format of status information table TBL1-m according to this embodiment.

FIG. 6 is a diagram illustrating the details of the memory function of customer management database 515 according to this embodiment.

FIG. 7 is a diagram illustrating the details of the memory function of status information memory unit 514 according to this embodiment.

FIG. 8 is a diagram illustrating the details of the memory function of terminal information database 516 according to this embodiment.

FIG. 9 is a diagram illustrating the details of the memory function of authentication database 541 according to this embodiment.

FIG. 10 is a diagram illustrating the details of the memory function of server information database 551 according to this embodiment.

FIGS. 14A, 14B, 14C, 14D, 14E, 14F, 14G, 14H, 14I, 14J, 14K, 14L, 14M, and 14N are diagrams illustrating an example of the transition of the pictures on the display unit of the terminal 1 according to this embodiment.

FIGS. 15A, 15B, 15C, 15D, 15E, 15F, 15G, 15H, 15I, 15J, 15K, and 15L are diagrams illustrating an example of the transition of pictures on the display unit of terminal 1 according to this embodiment.

FIGS. 16A, 16B, 16C, 16D, and 16E are diagrams illustrating an example of the transition of pictures on the display unit of terminal 1 according to this embodiment.

FIG. 20A and FIG. 20B are diagrams illustrating an example of the transition of pictures on the display unit of terminal 1 according to this system.

FIG. 21 is a diagram illustrating the details of memory function of customer management database 515 according to modification 1-1.

FIG. 26 is a diagram illustrating status information table TBL2-m provided in status information table memory unit 614 according to this embodiment.

FIGS. 27A, 27B, 27C, 27D, 27E, 27F, 27G, 27H, 27I, 27J, and 27K are diagrams illustrating an example of the transition of pictures on the display unit of terminal 1 according to this embodiment.

FIGS. 28A, 28B, 28C, 28D, and 28E are diagrams illustrating an example of the transition of pictures on the display unit of terminal 1 according to this embodiment.

FIGS. 30A, 30B, 30C, 30D, and 30E are diagrams illustrating an example of the transition of pictures on the display unit of terminal 1 according to this embodiment.

FIGS. 31A, and 31B are diagrams illustrating an example of the transition of pictures on the display unit of terminal 1 according to this embodiment.

BEST MODE FOR CARRYING OUT THE INVENTION

Preferred embodiments of the present invention will now be described with reference to the accompanying drawings. However, it will be apparent to those skilled in the art that the present invention is not restricted to these embodiments, and various modifications are possible within the scope of the technical concept of the art.

Figure 1:
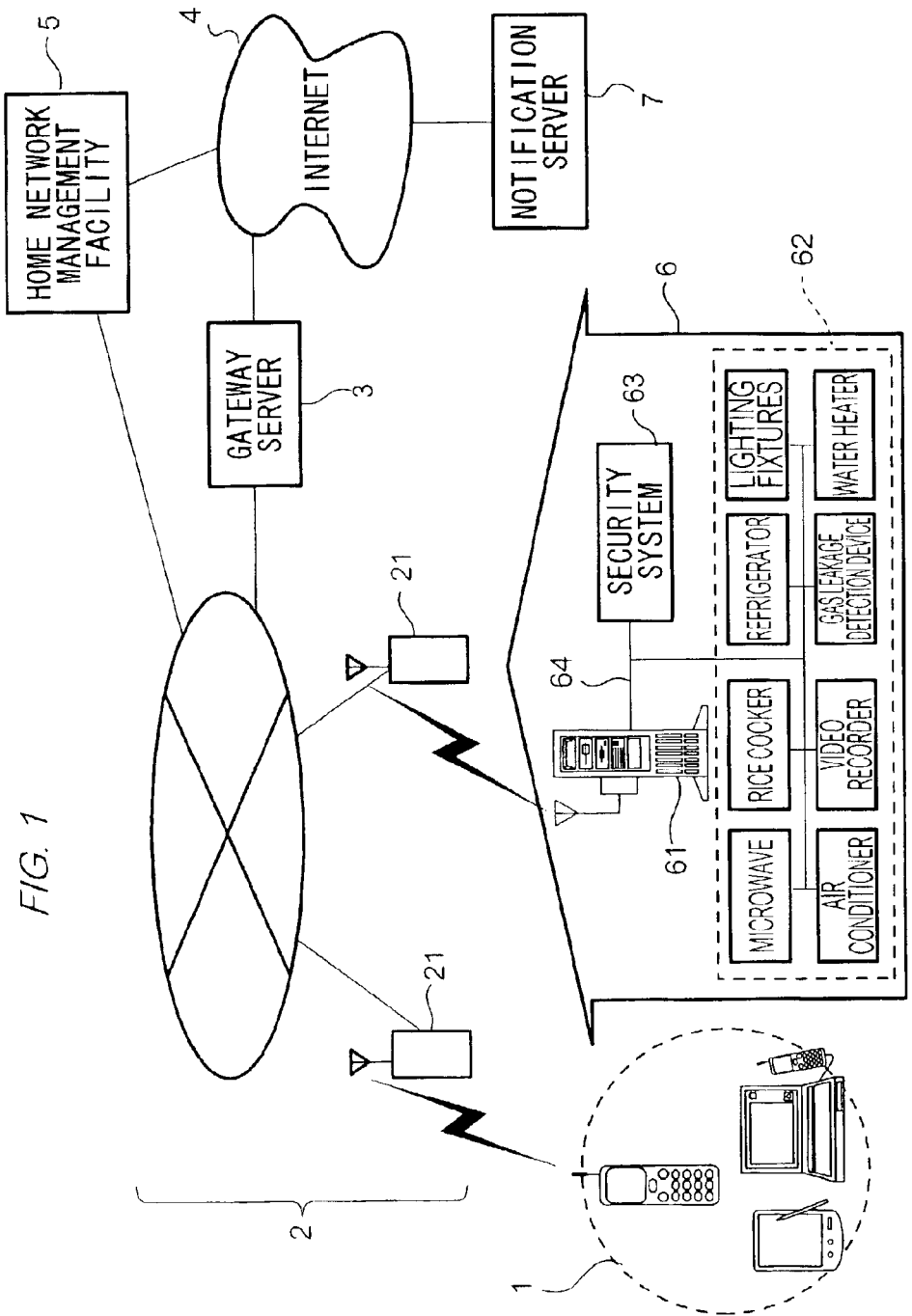
FIG. 1 is a diagram illustrating the configuration of the remote control system for performing a home network management system according to one of the embodiments in the present invention.

[1] First Embodiment
[1.1] Configuration of the First Embodiment
(a) Configuration of the Overall System FIG. 1 is a block diagram showing the configuration of a home network management system according to the first embodiment.

As show in FIG. 1, the home network management system in this embodiment comprises a plurality of terminals 1, mobile packet communication network 2, gateway server 3, the Internet 4, home network management facility 5, a plurality of home networks 6, and notification server 7. To avoid the FIG. 1 getting complicated, some of the terminals in all the terminals, and some of home networks 6 in all the home networks provided in terminal 1 are described.

In this embodiment, the home network management system provides a home network management service, which enables a user to perform remote control of home-located electronic devices in home network 6 provided in a user's house. In this case, the user is the user of terminal 1, and the user of the home-located electronic devices provided in home network 6.

Terminal 1 is a portable communication terminal comprising an instruction input unit, utilized by a user to input instructions; a display screen for displaying a picture; and a communication function to exchange packet data via mobile packet communication network 2. It is possible to use various communication devices such as a portable telephone, a note book PC, and PDA (Personal Digital Assistance), as terminals. Each such communication device has several manufactured models, which can function as terminal 1. Therefore, terminal 1 comprises various communication capabilities, and display capabilities depending upon the model used.

In this embodiment, the communication capability of terminal 1 is determined by the maximum amount of data in a single reception, and the maximum communication speed. Also, the communication capability of the terminal 1 in this embodiment is determined by the size of the picture; which can be shown on a display unit, the number of picture elements, the variations in colors and gradations; and the data format of the data which can be displayed in terminal A. Generally, the communication capability and display capability are low when terminal 1 is a portable telephone, but the communication capability and display capability are high when terminal 1 is a notebook PC. If it is MPEG (Moving Picture Expert Group), which is a compression/expansion system for moving pictures, it is easy to display by notebook PC, but difficult to display by portable telephone.

Also, terminal 1 comprises a memory function (not shown here). A terminal ID which identifies each terminal as an identifier, the model of terminal 1, the WWW (World Wide Web) browser for displaying information obtained from the resource on the Web, and the program (hereafter referred to as an access browser) to communicate directly with home network management facility 5 via a mobile packet communication network are memorized in this memory. Terminal 1 communicates directly with home network management server 5 through the WWW browser and the access browser.

Gateway server 3 is a computer system provided in a mobile packet gateway relay exchange station (not shown here) which connects the Internet 4 to mobile packet communication network 2. The gateway server 3 mediates to transmit and receive data among different networks. Specifically, gateway server 3 converts the data for mobile packet communication network 2 transmitted from the terminal 1, to the data for TCP/IP (Transmission Control Protocol/Internet Protocol) which the Internet 4 follows, and transmits it to the Internet 4. Also, gateway server 3 converts the data transmitted from the Internet 4, to the data for mobile packet communication network 2 which follows the transmission protocol, and transmits the data to mobile packet communication network 2.

And, gateway server 3 is one which connects terminal 1 to the Internet 4 when the terminal 1 is a portable telephone. Accordingly, when terminal 1 is a notebook PC, or PDA, it may be connected to an access point for the Internet 4 without going through gateway server 3 by wire connection.

A mobile packet communication network 2 provides a packet exchange service with terminal 1 and the home network 6 via a base station 21. Mobile packet communication network 2 has a service control station and an exchange station. (not shown here).

A home network 6 is a home network installed in respective houses. Home network 6 comprises a home server 61, home-located electronic device group 62, and a security system 63, each of which are mutually connected by home bus 64.

The home-located electronic device in home-located electronic device group is a microwave, a rice cooker, a refrigerator, lighting fixtures, an air conditioner, a video recorder, a gas leakage detection device, a water heater and so forth. Each home-located electronic device has a function to communicate with home server 61 via home bus 64.

Security system 63 is a computer system to detect an emergency situation (An object is in designated status for detection) which occurs in a house. Specifically, security system 63 detects that a window is broken; or controls locks in the house; and communicates with home server 61 via home bus 64. Security system 63 transmits notification of the emergency (hereafter referred to as an alarm) to home server 61. Also, security system 63 performs a process to modify lock status and so forth followed by an instruction from home server 61.

The communication standard for home server 61, home-located electronic device group 62, and security system 63 may be used on an optional basis. For example, USB (Registered Trademark), IEEE1394, Home RF or Bluetooth (Registered Trademark), Havi (Registered Trademark), jini (Registered Trademark) or UpnP (Universal plug and play), and so forth.

Home server 61 communicates with home network management facility 5 via mobile packet communication network 2, and controls home-located electronic device group 62 and security system 63. Home server 61 transfers the received alarm to home network management facility 5 when an alarm is transmitted from security system 63.

Home network management facility 5 manages home network 6. That is to say, when home network management facility 5 receives a control instruction for remote control from a user of terminal 1, home network management facility 5 seeks for home network 6 corresponding to the user, and transmits the received control instruction to home server 61 in home network 6 via mobile packet communication network 2.

Also, when home network server management facility 5 receives alarm from home server 61, home network server management facility 5 generates an electronic mail in accordance with the information on the alarm, transfers the electronic mail to terminal 1 of the user corresponding to home server 61. And, home network management facility 5 notifies notification server 7 according to the instruction from the terminal of user 1. The electronic mail generated in home network management facility 5 will be described later.

Notification server 7 is a computer system which the police station or a security company owns, and an event corresponding to the information on the alarm is generated. In the police station or the security company, the policemen or security guards are sent based on the event.

(b) Configuration of Home Server 61

Figure 2:
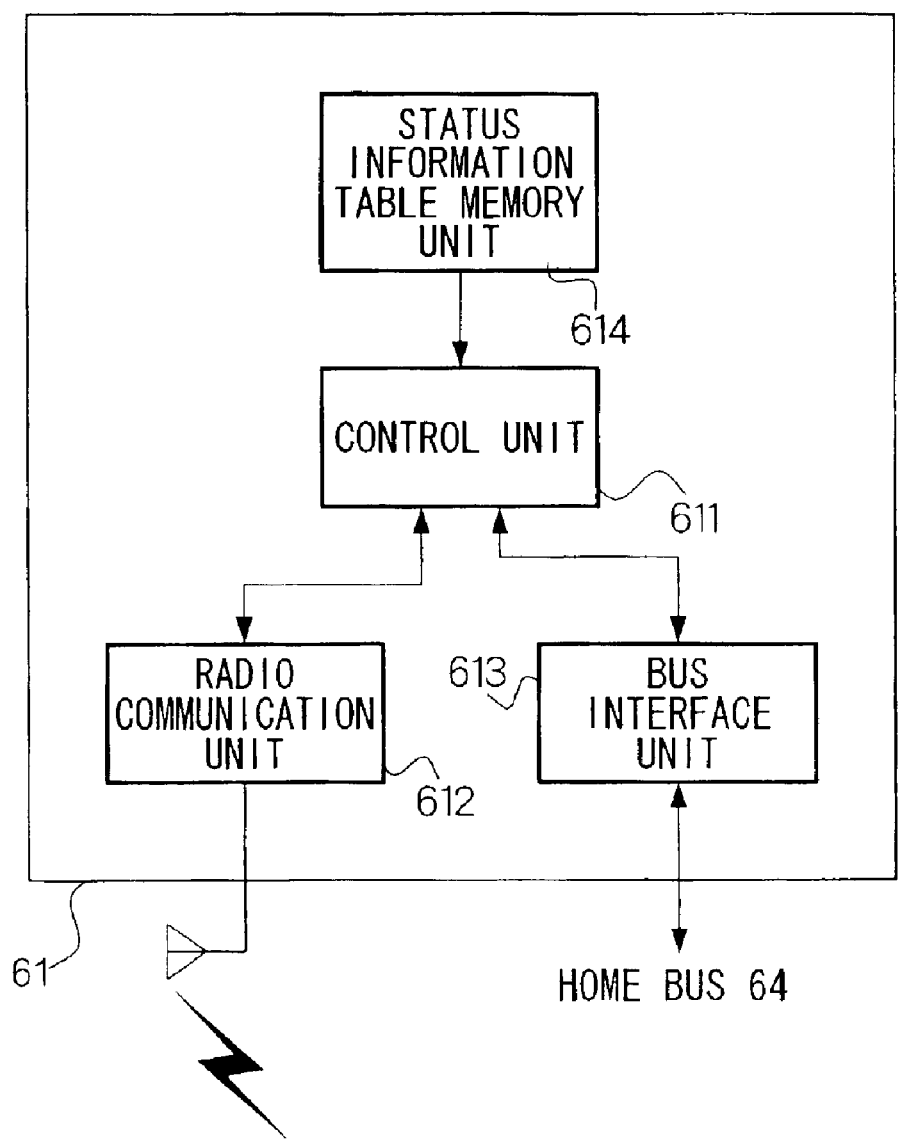
FIG. 2 is a block diagram illustrating an example of the configuration of home server 61 according to this embodiment.

The configuration of home server 61 is described in FIG. 2. As shown in this figure, home server 61 comprises control unit 611, radio communication unit 612, bus interface unit 613, and status information table memory unit 614.

Control unit 611 comprises CPU (Central Processing Unit), ROM (Read Only Memory), RAM (Random Access Memory), and a hard disk, each of which are not shown here. A home network ID, which is a identifier which home network management facility 5 specifies home network 6, security system 63 stored in home network 6, and driver software for controlling a home-located electronic device group 62, and the various control programs are provided in the hard disk. The CPU performs the various control programs. The RAM is used as work area for the CPU.

The control programs provided in the hard disk are as follows:

(1) Home Network Control Program

A home network control program communicates with home network management facility 5. This is the program for controlling security system 63 and home-located electronic device group 62 according to a control instruction from home network management facility 5.

(2) Notification Program

A notification program is a program to transfer the received alarm to home network management facility 5 when an alarm is transmitted from security system 63.

Radio communication unit 612 communicates with mobile packet communication network 2 via base station 21. It enables home server 61 to transmit and to receive the data to and from home network management facility 5. Bus interface unit 613 is connected to home server 61, home-located electronic device group 62, and security system 63 via home bus 64.

Security system 63 controlled by home server 61, and a status information table TBL1-m (m=1–k) to show the status information of home-located electronic device group 62 are provided in status information table memory unit 614.

FIG. 3 is a conceptual diagram for showing the format of memory of status information table TBL1-m. Each status information table TBL1-m corresponds to each home-located electronic device or security system 63, and each table is configured by home-located electronic device categories for the home-located electronic devices (That is to say, the names of the home-located electronic devices), and the status information to show the latest status of the home-located electronic devices and so forth.

For example, status information table TBL1-1 is the table corresponding to security system 63 in FIG. 3. The lock status of a door, a lock log for the house, and operation status of security system 63 are provided in status information table TBL1-1. The operation status means whether security system 63 is set or not.

Also, status information table TBL1-2 is the table corresponding to video recorder 62 in an home-located electronic device group. The status of presetting program recording, the amount of recording time which a video tape in the video recorder has, and a recording history are provided in status information table TBL1-2. As shown in this figure, a plurality of status with regard to presetting program recording are provided in status information table TBL1-2, and each status corresponds to a recording start date and time, a recording stop date and time, and a recording channel.

When a user requests status information by utilizing terminal 1, the status information is transmitted to home server 61 corresponding to the user via home network management facility 5. And, control unit 611 in home server 61 transmits home-located electronic device categories provided in status information table TBL1-m, and the status information to home network management facility 5 when receiving the status information request.

(c) Configuration of a Home Network Management Facility 5

Figure 4:
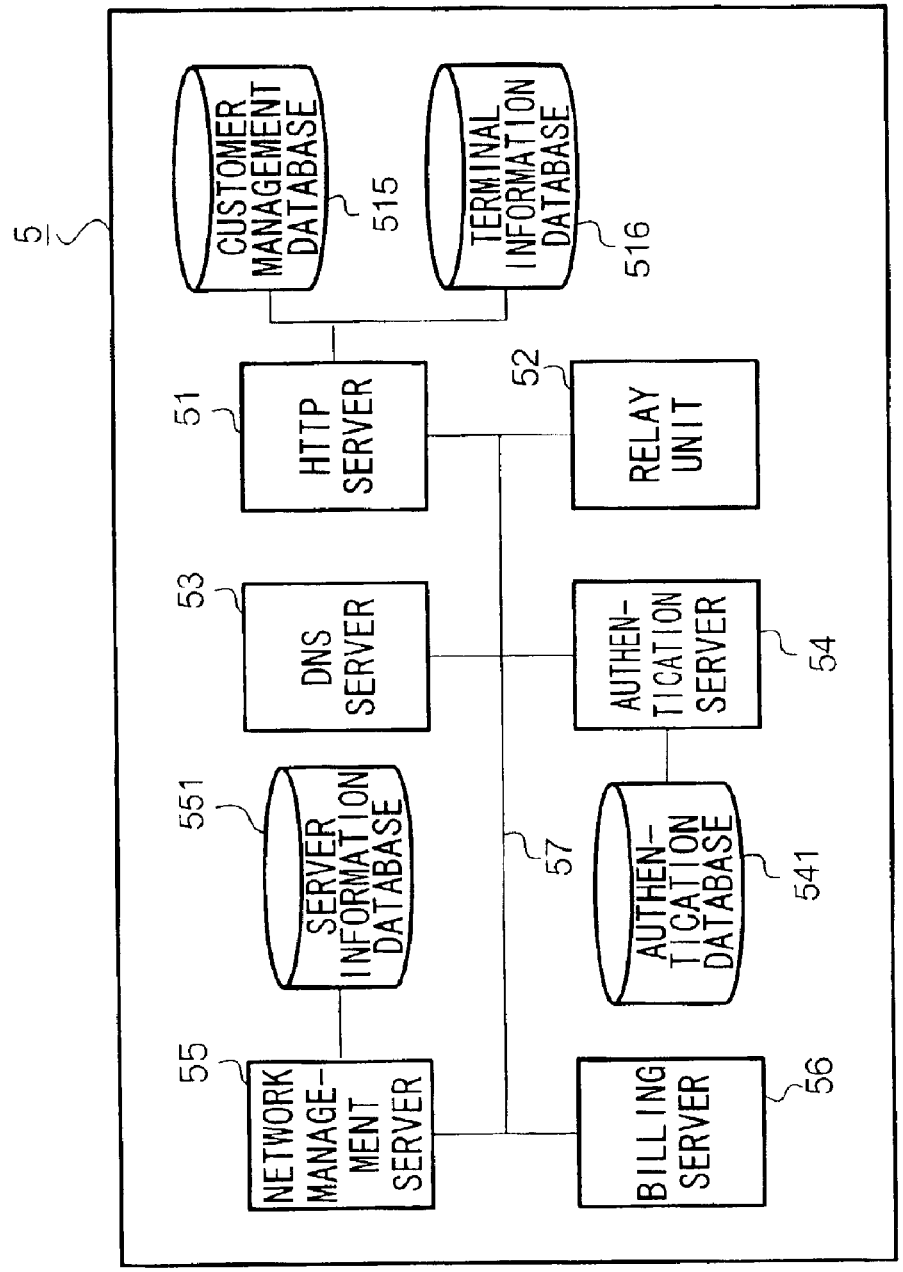
FIG. 4 is a block diagram illustrating an example of the configuration of home network management facility 5 according to this embodiment.

FIG. 4 is a block diagram illustrating the configuration of home network management facility 5. As shown in this figure, home network management facility 5 comprises HTTP server 51, relay unit 52, DNS (Domain name system) server 53, authentication server 54, network management server 55, billing server 56, and bus 57.

HTTP server 51 is connected to the Internet 4; and has a function as a WWW server. The URL corresponding to each resource (the resource corresponding to a Web screen or a home screen of the Web screen's initial screen and so forth) is configured in the resource on home server 51. HTTP server 51 transmits to terminal 1, the data corresponding to the URL included in the GET request when receiving a GET request in the HTML data from terminal 1.

Figure 5:
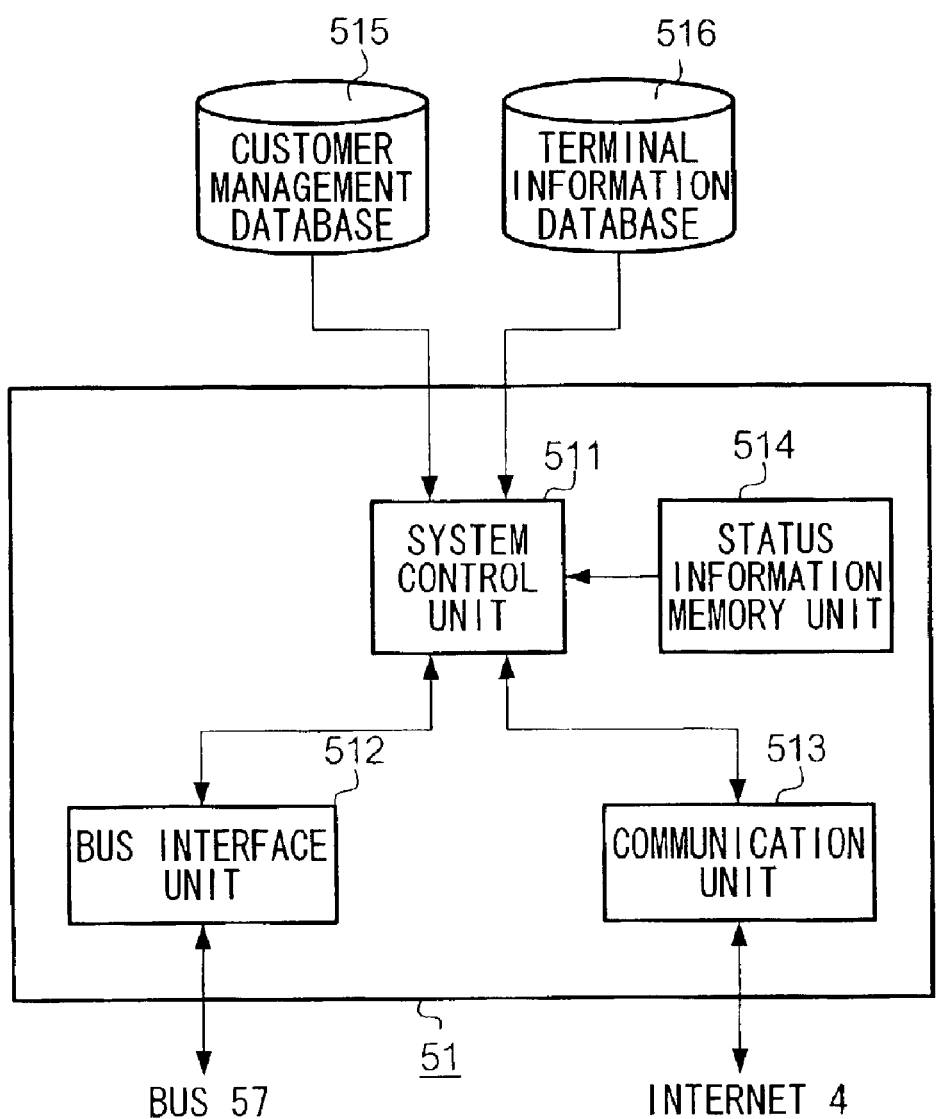
FIG. 5 is a block diagram illustrating an example of the configuration of HTTP server 51 according to this embodiment.

FIG. 5 is a block diagram illustrating the configuration of HTTP server 51. As shown in this figure, HTTP server 51 comprises system control unit 511, bus interface unit 512, communication unit 513, and status information memory unit 514. Also, system control unit 511 is connected to customer management database 515, and terminal information database 516.

Communication unit 513 mediates to receive and to transmit data between the Internet 4 and system control unit 511. Specifically, as well as transmitting the received data to system control unit 511 via the Internet 4, communication unit 513 sends out data transmitted from system control unit 511 to the Internet 4. Bus interface unit 512 mediates to receive and to transmit data between system control unit 511 and bus 57.

System control unit 511 comprises CPU, ROM, RAM, and a hard disk; and performs a process of controlling each unit in HTTP server 51. The following programs are provided in the ROM. That is to say, a control program for which the CPU generates data to transmit to terminal 1 when system control unit 511 receives a GET request from terminal 1; a control program for which the CPU follows an instruction from terminal 1 to transmit the control instruction to home network 6; and a control program for which the CPU generates an electronic mail corresponding to the alarm, to be transmitted to terminal 1 when an alarm is transmitted from home server 61. The CPU performs the processes by performing these programs. The RAM is used as a work area for the CPU.

FIG. 6 is a conceptual diagram showing the details of memory of customer management database 515. As shown in this figure, a terminal ID, a home network ID for home network 6 which a user can control, and a security level corresponding to the user of customer management database 515 are provided in customer management database 515 corresponding to a user ID belonging to the user of terminal 1.

The user ID is an identifier assigned to a user who joins a home network management service. Also, the home network ID includes an address for which HTTP server 51 communicates with a home server 61 via network management server 55.

And, the security level shows the limit range with regard to the control when each user performs the remote control for home network 6. That is to say, the security level shows the range of beginning and ending which enables the user to control, and the differences will be described below.

(1) Level 1

Level 1 is the lightest level with regard to control. A user of terminal 1 whose level 1 is set can perform remote control of security system 63 provided in home network 6, and every home-located electronic device in home-located electronic device group 62.

(2) Level 2

A user of terminal 1 whose level 2 is set can perform the remote control of home-located electronic device group 62, but cannot control the security system 63.

(3) Level 3

A user of terminal 1 whose level 3 is set cannot perform the remote control of the system security 63, and some specified items with regard to home-located electronic device group 62.

The security for home network 6 is guaranteed by configuring the security level for each user. For example, it is assumed that a user of terminal 1 is a child, and security level 3 is set to the user. At this point, security level 3 is preset to a disable status for control of a water heater in home-located electronic device group 62, to thereby prevent a child controlling the temperature, or unlocking a door by mistake.

And the security level may be set by a user in the configuration when the user joins a home network management service, or it may be modified after the user joins the service.

Next, FIG. 7 is a conceptual diagram illustrating the details of memory of status information memory unit 514.

As shown in this figure, home-located electronic device categories with regard to home-located electronic devices controlled by home network 6, and the status information, both of which corresponds to the home network ID, are provided in status information memory unit 514. HTTP server 51 obtains the status information stored in status information memory unit 514 from home server 61 when receiving a request for the status information from terminal 1. Accordingly, the status information stored in status information memory unit 514 is the same as that which home server 61 has at the point when HTTP server 51 transmits the status information to terminal 1.

System control unit 511 modifies the status information according to an instruction from a user. And, system control unit 511 transmits to home server 61, a control instruction including the modified status information.

Home server 61 provides the status information including the control instruction with status information table TBL1-m owned by home server 61 itself. And, home server 61 executes driver software memorized in a hard disk responsive to the status information in status information table TBL1-m, and controls the home-located electronic devices. That is to say, home server 61 performs control operations corresponding to the status information when the status information stored in status information table TBL1-m is modified.

FIG. 8 is a conceptual diagram illustrating the details of memory of terminal information database 516. As shown in this figure, the display capability, communication capability, and the communication standard (hereafter referred to as terminal communication standard ) corresponding to the model of terminal 1 (including a category of terminal 1) are provided in terminal information database 516. The terminal communication standard in this case is the communication standard to be followed when HTTP server 51 communicates with terminal 1, and it is different depending upon the model of terminal 1 or category. For example, if terminal 1 is a notebook PC, it follows HTTP1.1 and so forth as communication protocol, if terminal 1 is a portable telephone, it follows a subset protocol of HTTP and so forth.

Also, a measure provided in terminal information database 516 for indicating the display capability and the communication capability may be anything, but it is measured on a scale from level 1 to level 5 depending upon the difference of the display capability and the communication capability of each terminal in this embodiment. For example, when the level of the display capability is level 1, it indicates that terminal 1 is a communication terminal such as a portable telephone which have low display capability. On the contrary, when the level of the display capability is level 5, it indicates that terminal 1 is a communication terminal such as a notebook PC which have high display capability. Similarly, if the communication capability has a higher level, it shows a higher communication capability.

System control unit 511 modifies data (e.g. web screen) which should be transmitted to terminal 1 depending upon the communication capability and the display capability of terminal 1. For example, with regard to data which should be transmitted to terminal 1 which has low communication capability and display capability, system control unit 511 generates the data within the receiving capability of terminal 1, or generates the data on the basis of the size of the picture, variations in colors, and gradations can be displayed on the display unit of terminal 1. Also, if picture image is added to an HTML data by an image tag and so forth, the data format of the picture image, which is not displayed by the display capability of terminal 1, may be added. In this case, system control unit 511 modifies the data format of the picture image to correspond to the display capability of terminal 1. This ensures that terminal 1 receives the transmitted data, and is able to display the data. Description of the image tag regulation in system control unit 511 will be omitted as it is the same as regulated in the preceding HTML data.

Relay unit 52 mediates to receive and to transmit data between mobile packet communication network 2 and bus 57. Specifically, when HTTP server 51 performs a direct communication with terminal 1 via mobile packet communication network 2, relay unit 52 converts the data transmitted from terminal 1 to the data which bus 57 can use, and outputs the data to bus 57. Also, relay unit 52 converts the data transmitted from bus 57 to a transmission protocol form which the mobile packet communication network 2 can use, and transmits the data to mobile packet communication network 2. The communication between mobile packet communication network 2 and home network management facility 5 via relay unit 52 may be performed by wire or radio.

DNS server 53 takes charge of an IP address, and a domain name which HTTP server 51 requires when receiving and transmitting data via the Internet 4.

Authentication server 54 is a server for authentication of the user of a terminal when an authentication request is transmitted from the terminal. Authentication server 54 comprises authentication database 541.

FIG. 9 is a diagram illustrating details of memory of authentication database 541. As shown in this figure, passwords corresponding to user IDs for each user are provided in authentication database 541. The authentication process in authentication server 54 will be described later.

Network management server 55 manages to receive and transmit data between home network 6 provided in home network management facility 5 and HTTP server 51. Also, network management server 55 comprises server information database 551.

FIG. 10 is a conceptual diagram illustrating the details of the memory of a server information database. As shown in this figure, communication standard (hereafter referred to as network communication standard) corresponding to home network IDs for each home network, which home network 6 follows, is provided in server information database 551. In this case, the network communication standard is the communication standard to be followed when home server 61 communicates with an outside terminal. For example, HTTP1.0, HTTP1.1, Novel Ltd. (Registered Mark) and so forth are well-known.

Along with offering a home network management service, billing data corresponding to the management charges for each user is memorized in billing server 56. And, the billing data also corresponds to home network 6. The frequency of updating the billing data can be selected. For example, the management charge may be updated on a monthly basis as a total cumulative amount, or it may be updated according to a given price list each time home network 6 is controlled by utilizing terminal 1. In this embodiment, a charge is made each time remote control for home network 6 is performed by utilizing terminal 1.

[1.2] Operation of the First Embodiment

The operations of this embodiment will be described as follows:

(a) The remote control operation which a user performs with home network 6 by utilizing terminal 1;
(b) The operation of alarm transmission to terminal 1 from home network 6.

The details of a memory in each database and in each table described above are the same as the ones shown in FIG. 6, FIG. 8, FIG. 9, and FIG. 10. Also, terminal 1 is a model name [model a] (e.g. a portable telephone); and comprises [terminal a] as a terminal ID. Also, a user ID for a user of terminal 1 is [user. a] as shown in FIG. 9.

(a) A remote control operation of home-located electronic devices which a user performs home-located electronic devices in home network 6 by utilizing terminal 1.

There are two operation examples which will be described below.

OPERATION EXAMPLE 1-a-1

In this example, a user performs remote control of home network 6 by accessing home server management unit 5 via the Internet 4 by utilizing terminal 1.

Figure 11:
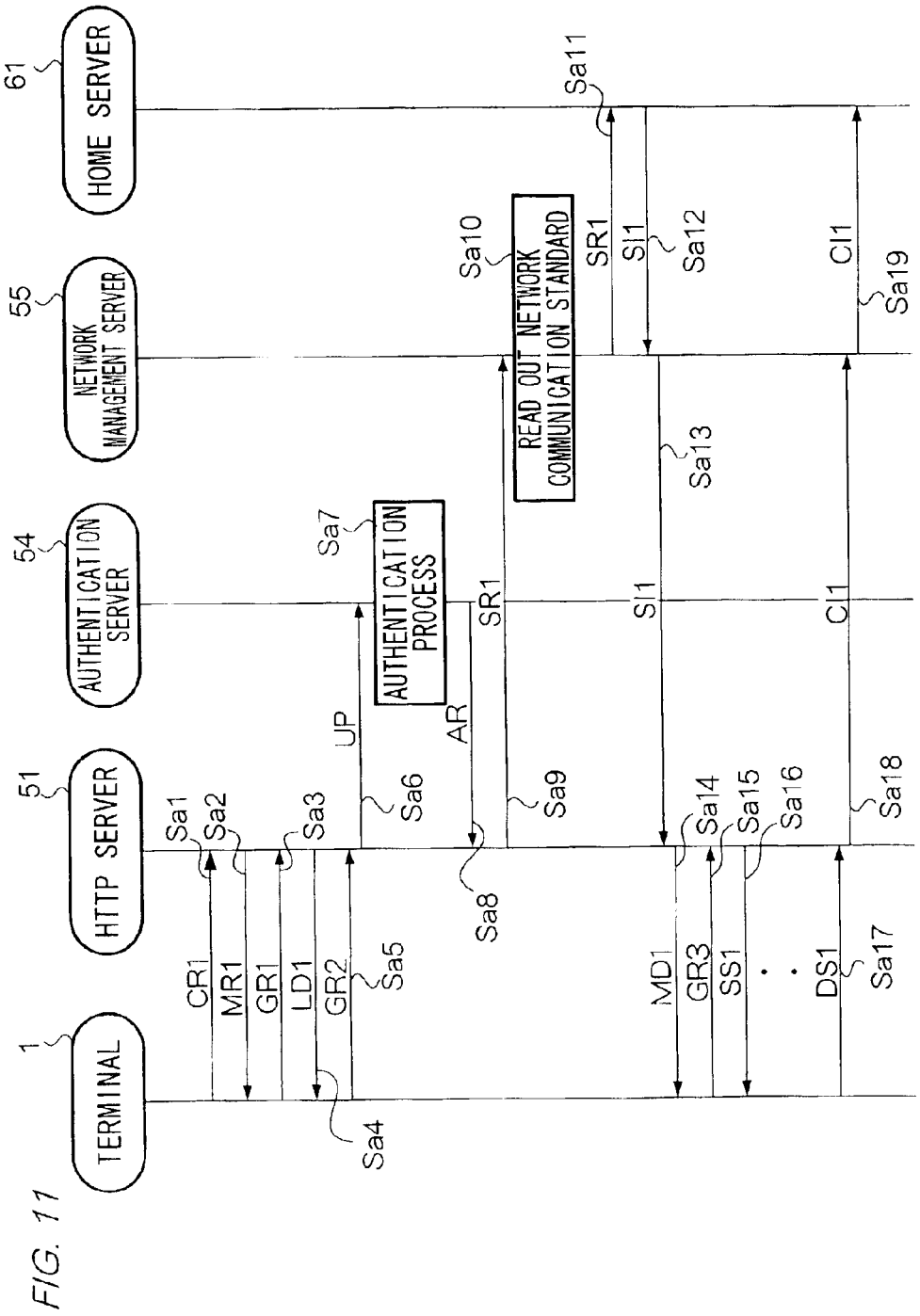
FIG. 11 is a diagram illustrating the sequence of the overall system according to the operation example 1-a-1 of this embodiment.

FIG. 11 is a sequence diagram of this operation example.

When a user forgets to perform the presetting program recording while at home, the user can input the programming remotely by operating instruction input unit of terminal 1. In terminal 1, the WWW browser is read out according to the input instruction. And, terminal 1 performs a packet registration at mobile packet communication network 2. The packet registration is a registration process by which terminal 1 exchanges packets via mobile packet communication network 2. When the packet registration is completed, terminal 1 can exchange packets with gateway server 3.

Next, terminal 1 transmits communication request CR1 to HTTP server 51 via mobile packet communication network 2. In this case, terminal 1 adds the terminal ID [terminal a] to communication request CR1, and transmits it to HTTP server 51. Further, with regard to the transmission of information from terminal 1 to home network management facility 5, terminal 1 adds the terminal ID to the information in the transmission. Communication request CR1 sent out to mobile packet communication network 2 by terminal 1 is received by gateway server 3, and transmitted to HTTP server 51 via the Internet 4. (Step Sa1).

HTTP server 51 transmits model request MR1 to terminal 1 via the Internet 4 when receiving communication request CR1. (Step Sa2); model request MR1 is transmitted to terminal 1 via gateway server 3. Terminal 1 reads out its own model name [model a] from memory when receiving model request MR1. Terminal 1 transmits GET request GR1 to which the model name is added to HTTP server 51 for obtaining a log-in screen. (Step Sa3) In this case, the log-in screen is a screen for prompting to input user ID and password, and for the user of terminal 1 to log into HTTP server 51.

Figure 13:
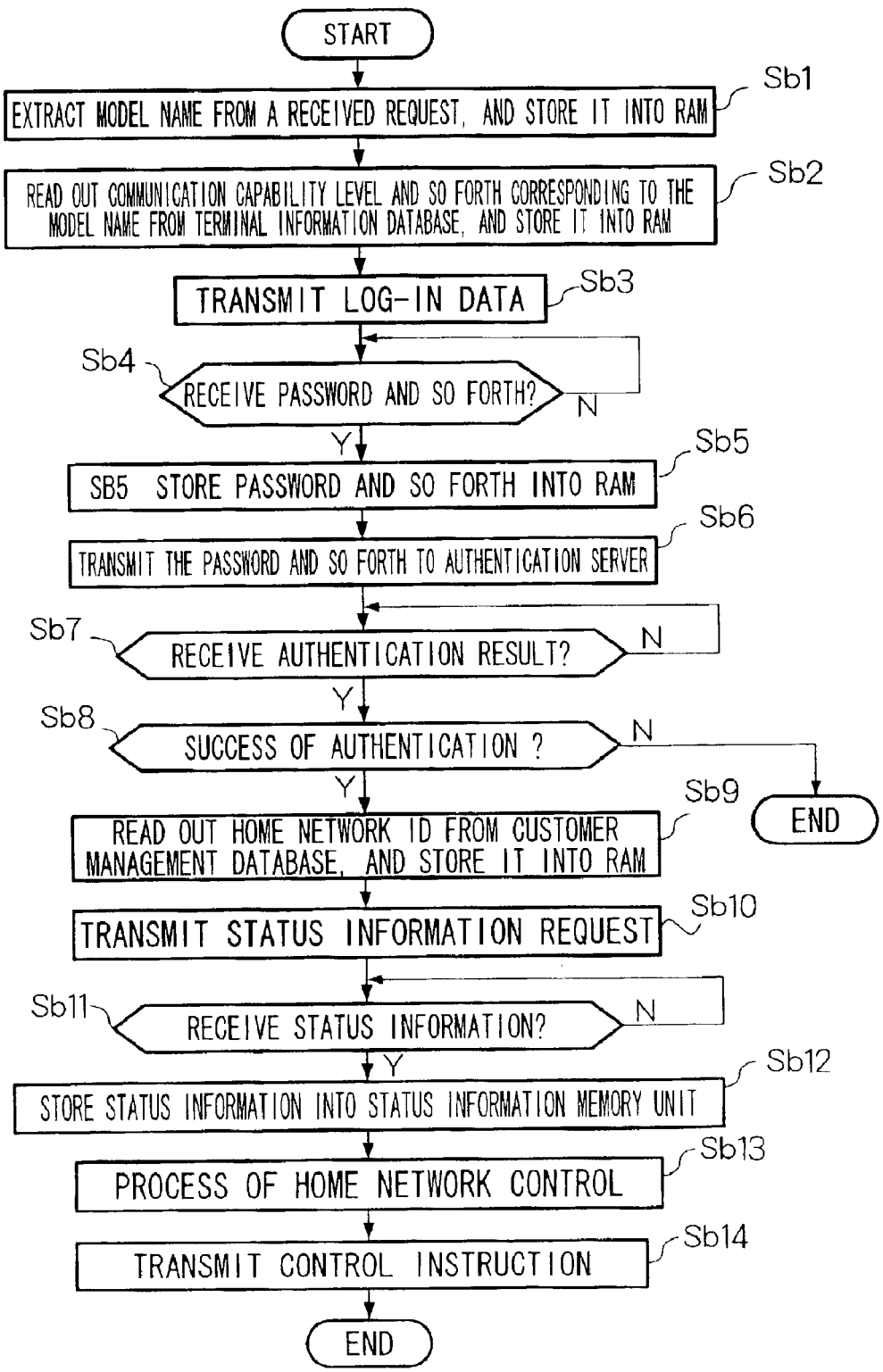
FIG. 13 is a flowchart illustrating the process of the system control unit of HTTP 51 in the operation example 1-a-1 according to this embodiment.

On the other hand, when the GET request GR1 is received by HTTP server 51, system control unit 511 starts to perform a flow process as shown in FIG. 13, and at the same time the operation shown in FIG. 11.

Firstly, system control unit 511 extracts the model name [model a] added to the GET request GR1, and stores the model name in RAM. (Step Sb1 in FIG. 13) And, system control unit 511 reads out the display capability level (level 1 in this case) corresponding to the model name [model a], the communication capability level (level 1 in this case), and terminal communication standard (standard 1) from terminal information database 516, and stores them in RAM. (Step Sb2 in the FIG. 13).

Next, system control unit 511 generates data (hereafter referred to as log-in data ) to be transmitted to terminal 1 which corresponds to a log-in screen. System control unit 511 modifies the log-in data to be generated according to display capability level 1 and communication capability level 1. However, if a picture format displayed on the screen is different depending upon the model of terminal 1, a user may encounter problems in using terminal 1 of a different model. Therefore, system control unit 511 generates log-in data for the layout of the screen which is the same for the screen displayed on any model of terminal 1. Therefore, the user will be able to use all models of terminal 1 similarly.

System control unit 511 transmits log-in data LD1 to terminal 1 via the Internet 4 according to the terminal communication standard (standard 1) provided in RAM. (Step Sa4 in the FIG. 11 and Step Sb3 in the FIG. 13). When the transmission is completed, system control unit 511 performs a verification check on whether the password and so forth are transmitted from terminal 1. (Step Sb4 in the FIG. 13) System control unit 511 repeats the verification check in Sb4 of a password and so forth transmitted from terminal 1.

Figure 12:
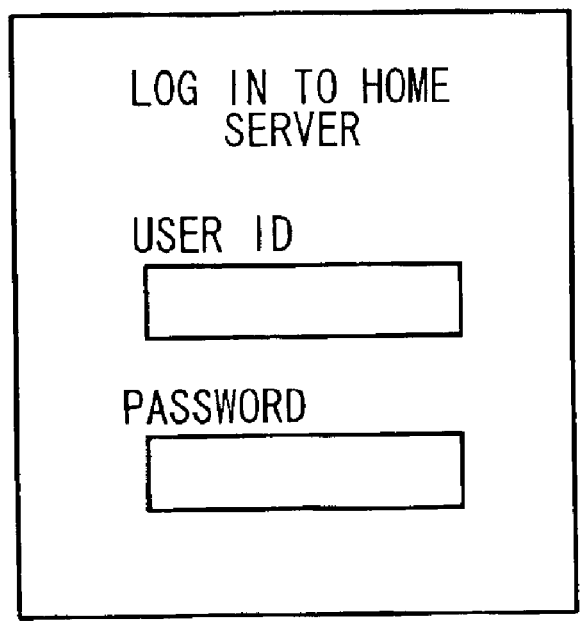
FIG. 12 is a diagram illustrating the example of a log-in screen displayed on a display unit of a terminal 1 according to this embodiment.

On the other hand, log-in data LD1 is received by terminal 1, which displays the screen shown in FIG. 12. To make a decision, the user inputs user ID [user. a], and the password [xxxxx] to the instruction input unit. And, terminal 1 transmits to HTTP server 51, GET request GR2 to which the user ID [user. a], and password [xxxxx] are added, to obtain the next screen. (Step Sa5).

When the GET request is received in FIG. 13, the verification in Step Sb4 is YES. And, the user ID [user. a] and the password [xxxxx] are extracted from GET request GR2, and system control unit 511 in HTTP server 51 and stores the user ID and the password in RAM. (Step Sb5) Further, system control unit 511 reads out the user ID [user. a] and the password [xxxxx], and transmits the user ID and the password to authentication server 54 via bus interface unit 512. (Step Sa6 in FIG. 11).

Next, system control unit 511 is ready to verify whether the authentication result has been transmitted from authentication server 54 (Step Sb7 in the FIG. 13). The verification in Step Sb7 is NO until the authentication result is transmitted, and therefore verification operation is repeated.

On the other hand, authentication server 54 which has received the user ID [user. a] and the password [xxxxx] authenticates the identity of the user. (Step Sa7) Authentication server 54 performs the following process in Step Sa7 for authentication.

(1) Authentication server 54 reads out the password, corresponding to the user ID [user. a] transmitted from HTTP server 51, from authentication database 541.
(2) Authentication server 54 authenticates the password which is read out by determining whether it is the same as that transmitted from the HTTP server.

Authentication server 54 transmits the authentication result AR to HTTP server 51. (Step Sa8) When HTTP server 51 receives the authentication result AR, the verification in Step Sb7 (FIG. 13) is YES in system control unit 511 in HTTP server 51, and the process moves to Step Sb8. And, system control unit 511 verifies whether the authentication result transmitted from authentication server 54 is a notification of authentication success. (Step Sb8 in FIG. 13).

If it is verified that the passwords in (2) are not the same because of a typing mistake and so forth, authentication server 54 transmits a notification of authentication failure as the authentication result AR. In this case, in system control unit 511 in HTTP server 51, the verification in Step Sa8 in FIG. 13 is NO, the notification of authentication failure is transmitted to terminal 1, and the process is completed. As a result, the information [the authentication ends in failure, and control of the home network is not performed] is displayed on the display unit of terminal 1. In this case, the user has to repeat the process.

On the contrary, in this embodiment, the passwords are the same. Therefore, the notification of authentication success is transmitted from authentication server 54 as the authentication result AR. In this case, in system control unit 511, the verification in step Sb8 in FIG. 13 is YES, and the process moves to Step Sb9. System control unit 511 reads out a home network ID [home. a] corresponding to the user ID [user. a] stored in RAM, and security level [level 1] from customer management database 515; stores them in the RAM. From this point, home network management system 5 verifies that the signals received from terminal 1 are the signals corresponding to the home network ID [home. a], with regard to the remote control of home-located electronic devices in home network 6.

By this point, the terminal ID [terminal a], the user ID [user a], the password [xxxxx], the security level [level 1], the home network ID [home. a], the model name [model a], the display capability level [level 1], the communication capability level [level 1], and the terminal communication standard [standard 1] are provided in the RAM in system control unit 511.

Next, system control unit 511 reads out the home network ID [home. a] provided in the RAM, and transmits status information request SR1 to which the home network ID is added, to network management server 55. (Step Sa9 in FIG. 11 and Step Sb10 in FIG. 13) And, system control unit 511 is ready for verifying whether status information SI1 is transmitted from network management server 55, and the verification in Step Sb11 is NO until status information SI1 is transmitted from home server 61. (Step Sb11 in FIG. 13).

In FIG. 11, network management server 55 extracts the home network ID [home. a] included in status information request SR1, and reads out network communication standard [standard 1] corresponding to the home network ID [home. a] from server information database 551. (Step Sa10) After which, network management server 55 performs communication with home server 61 according to the network communication standard [standard 1].

Next, network management server 55 transmits status information request SR1 to home server 61. (Step Sa11) Home server 61 transmits home-located electronic device categories for each home-located electronic device to which its own home network ID is added, and status information SI1 of home-located electronic device to the network management server 55 when receiving status information request SR1. (Step Sa12) At this point, home server 61 transmits status information SI1 to which the home network ID [home. a] is added, to network management server 55. With regard to the transmission of information from home server 61 to home network management facility 5 hereafter, home server 61 adds the home network ID [home. a] to each piece of information, and transmits the information. Status information SI1 is transferred to HTTP server 51 by network management server 55. (Step Sa13).

On the other hand, when system control unit 511 in HTTP server 51 receives status information request SI1, the verification in Sb11 of FIG. 13 is YES, and the process moves to Step Sb12. And, system control unit 511 stores status information memory unit 514, the status information transmitted from the home server, and home-located electronic device categories, both of which correspond to the home network ID [home. a]. (Step Sb12 in FIG. 13) For example, if the status information transmitted from home server 61, and home-located electronic device categories are the same as the ones shown in FIG. 3, the status information shown in FIG. 7 is stored in status information memory unit 514 in HTTP server 51 by system control unit 511.

At this point, the status information stored in status information memory unit 514 is decided by the security level of terminal 1. For more details, system control unit 511 stores in status information memory unit 514, the status information corresponding to the security level of the terminal 1 user among the status information transmitted from home server 61. In other words, the only status information with regard to the home-located electronic devices, which are remotely controlled by the terminal 1, is stored in status information memory unit 514.

In this embodiment, the security level corresponding to the user is level 1. In this security level, the user of terminal 1 can perform remote control of the home-located electronic devices included in security system 63. Then, system control unit 511 stores all status information received, in status information memory unit 514.

At this point, it is assumed that the security level corresponding to the user of terminal 1 is level 2 which can perform the remote control of home-located electronic devices except security system 63. In this case, system control unit 511 abandons the status information with regard to security system 63 included in the obtained status information, and writes the other home-located electronic device information in status information memory unit 514. By abandoning the status information with regard to the home-located electronic devices of which the user is not permitted to perform remote control depending upon the security level, it is possible to prevent the improper control of home-located electronic devices by the user.

Next, the process of home network control is performed between terminal 1 and HTTP server 51. (Step Sb13 in the FIG. 13).

FIGS. 14A, 14B, 14C, 14D, 14E, 14F, 14G, 14H, 14I, 14J, 14K, 14L, 14M, 14N, 15A, 15B, 15C, 15D, 15E, 15F, 15G, 15H, 15I, 15J, 15K, 15L, 16A, 16B, 16C, 16D and 16E are figures illustrating the transition of pictures displayed on a display unit of terminal 1 when the process of home network control is performed.

In this process, system control unit 511 generates menu data MD1 whose menu items are electronic categories (That is to say, the names of home-located electronic devices) stored in status information memory unit 514.

At this point, menu data MD1 is one of HTML data generated by system control unit 511 based on the status information memorized in status information memory unit 514. In details, the HTML data is data for showing the status of home-located electronic devices belonging to electronic group 62 provided in home network 6, which the user is able to control; and for displaying a screen for prompting the user to input control instructions of the home-located electronic devices on display of terminal 1. Also, the URL for which the user obtains detailed information, selects the control items designated by an anchor tug on the screen displayed by the HTML data. Accordingly, terminal 1 only has to insert a WWW browser, which is fit for a wide range of uses, to perform remote control without inserting software with regard to a function of special remote control such as RAS. The anchor tag is the tag which designates a link in the HTML data and the description will be omitted as this is used in the prior art.

Further, with regard to generating HTML data, HTTP server 51 generates HTML data corresponding to the display capability level, and communication capability level of terminal 1. Accordingly, failure of a proper display of data received by terminal 1 with a low display capability; or terminal 1 with a low communication capability receiving excess information do not occur.

And, system control unit 511 transmits menu data MD1 to terminal 1 corresponding to home network ID [home. a]. In details, system control unit 511 transmits menu data MD1 according to a terminal communication standard. (standard 1).

The names of the home-located electronic devices, which a user can operate by remote control within a range of the security level, are displayed on the display unit of terminal 1 as menu items. Specifically, terminal 1 displays the menu items shown in FIG. 14A. Next, in the status which a screen shown in FIG. 14A is displayed, a user performs input operation to designate [a video recorder] in the menu item for presetting a program recording. By this operation, the menu item [a video recorder] is displayed in reverse. At this point, when the user inputs instruction into input unit of terminal 1, terminal 1 reads out the URL corresponding to the menu item from menu data MD1. And, terminal 1 transmits GET request GR3 for the HTML data including the URL to HTTP server 51. (Step Sa15).

On the other hand, HTTP server 51 extracts URL from GET request GR3 when receiving GET request GR3. And, HTTP server 51 verifies whether the data, which should be transmitted to terminal 1 from the URL, corresponds to a setting screen of the video recorder.

Next, HTTP server 51 reads out the duration of recording time available among status information corresponding to the video recorder. And, HTTP server 51 generates setting screen data SS including the amount of [recording time] available by the HTML data, and transmits setting screen data SS to terminal 1. (Step Sa16) Also, setting screen data SS corresponds to Web page of HTTP server 51, and includes the menu items (URL-capable) with regard to [the video recorder].

On the other hand, as shown in FIG. 14E, terminal 1, which has received the HTML data, displays the setting screen comprising [presetting program recording], [recording information], [back] and so forth on a display. At this point, [the presetting program recording] is the menu item for recording programs with [the video recorder] which the user performs remote control, [the recording information] is the menu item for checking the status of presetting program preset in [the video recorder], and [back] is to go back to the screen corresponding to menu data MD1 described above.

To perform the presetting program recording, when the user performs the input operation to select [the presetting program recording] in the menu item to the instruction input unit of terminal 1, terminal 1 reads out the URL corresponding to [the presetting program recording], and transmits the GET request including the URL to HTTP server 51. System control unit 511, which has received the GET request, generates HTML data (corresponding to the setting screen ) corresponding to the URL added to the GET request, and transmits the HTML data to the terminal 1 via the Internet 4. When the HTML data is received, the setting screen is displayed in terminal 1 shown in FIG. 14F.

Next, the user performs the input operation to designate [recording start time], [recording stop time], and [recording channel] (These are called as [presetting program recording information]). Terminal 1 then transmits the GET request including the presetting program recording information to mobile packet communication network 2.

In HTTP server 51 which has received the GET request, system control unit 511 generates the status information based on the presetting program recording information added to the GET request, and the status information is provided in status information memory unit 514. Then, HTTP server 51 generates HTML data showing that the presetting program recording is received, and transmits the HTML data to the terminal 1 via the Internet 4. Terminal 1 displays a picture shown in FIG. 14G on the display when receiving the HTML data.

Next, when the user selects the recording information in the menu item to check whether the presetting program recording is performed or not, the terminal 1 transmits to HTTP server 51, the GET request including the URL corresponding to the recording information. System control unit 511 in HTTP server 51 follows the GET request, and reads out the information on the presetting program recording among the status information stored in status information memory unit 514 when receiving the GET request. And, system control unit 511 generates the HTML data including the status information, and transmits the HTML data to terminal 1. Terminal 1 displays the picture shown in FIG. 14H on the display when receiving the HTML data.

Also, it is assumed that a user when out of home would like to be able to switch on an air conditioner to control humidity in the home, in the instance, for example, that laundry is drying in the home. In this case, the user A selects [an air conditioner] displayed on the display of the terminal 1 shown in FIG. 14. System control unit 511 in HTTP server 51 generates the HTML data (corresponding to the setting screen ) corresponding to [the air conditioner], and transmits the HTML data to the terminal 1 via the Internet 4. And, the status information stored in status information memory unit 514 is modified by performing the process which is same as the presetting program recording for the video recorder. That is to say, the status information corresponding to the main switch of [the air conditioner] is modified to [ON] by the system control unit 511.

When a user selects [a security system] as well, a screen displayed on a display of terminal 1 is changed like FIG. 14A, FIG. 14B, FIG. 14C, and FIG. 14D, and when the user selects lighting fixtures, the screen displayed on the display of the terminal 1 is changed like FIG. 14J, FIG. 14K, FIG. 14L, FIG. 14M, and FIG. 14N. FIG. 15A, FIG. 15B, FIG. 15C, FIG. 15D, FIG. 15E, FIG. 15F, FIG. 15G, FIG. 15H, FIG. 15I, FIG. 15J, FIG. 15K, FIG. 15L, FIG. 16A FIG. 16B, FIG. 16C, FIG. 16D, and FIG. 16E go through the same process as well.

When the user performs input operation for stopping the control to an instruction input unit of terminal 1 after inputting the details for controlling home-located electronic devices, terminal 1 transmits a decision signal DS1 to HTTP server 51. (Step Sa17).

System control unit 511 in HTTP server 51 transmits to network management server 55, control instruction CI1, to which the modified status information is added, and stored in status information memory unit 514. (Step Sa18 and Step Sb14 in FIG. 13.) Then, control instruction CI1 is transferred to home server 61 by network management server 55, and received by home server 61. (Step Sa19).

Control unit 611 in home server 61 extracts the status information from received control instruction CI1, and overwrites status information table TRL1-m. Control unit 611 then executes driver software of the home-located electronic devices corresponding to the modified status information of status information table TRL1-m, and performs the remote control of the home-located electronic devices by following the modified status information. As a result, the presetting program recording requested by the user is performed, and the main switch of the air conditioner is also modified to ON.

Home server 61 transmits to network management server 55, control completion information for showing that the control designated by control instruction CI1 is performed. Network management server 55 receives the control completion information, and transfers the control completion information to HTTP server 51. HTTP server 51 transmits the control completion information along with the home network ID to billing server 56 when receiving the control completion information. Thus, in billing server 56, billing is made on the basis of data corresponding to the remote control each time when the control completion information is transmitted.

OPERATION EXAMPLE 1-a-2

Next, there follows an example of an operation in which direct communication is performed with home network management facility 5 by utilizing a terminal 1, but without use of the Internet 4.

The operation example will be described with reference to FIG. 17. However, since the operation example is basically the same as that of operation example 1-a-1, only those points which differ will be described.

Firstly, a user performs input operation to communicate with relay unit 52 in home network management facility 5 via mobile packet communication network 2 by operating an instruction input unit of terminal 1. Then, the access browser described above is read out according to the input operation in terminal 1.

And, terminal 1 performs a packet registration to mobile packet communication network 2. When the packet registration is performed, terminal 1 can perform a packet exchange with relay unit 52.

Next, terminal 1 transmits communication request CR2 to relay unit 52. (Step Sc1) Relay unit 52, which has received communication request CR2, transfers communication request CR2 to HTTP server 51. (Step Sc2)

System control unit 511 in HTTP server 51 transmits model request 2 MR2 to relay unit 52. (Step Sc3) Relay unit 52 transfers model request MR2 to terminal 1 when receiving model request MR2. (Step Sc4) Terminal 1 reads out its own model name [model a] from memory when receiving model request MR2. And, to obtain menu data, terminal 1 transmits to relay unit 52 via mobile packet communication network 2, GET request GR4 to which the model name is added. (Step Sc5). And, GET request GR4 is received by relay unit 52, and transferred to HTTP server 51. (Step Sc6).

Figure 18:
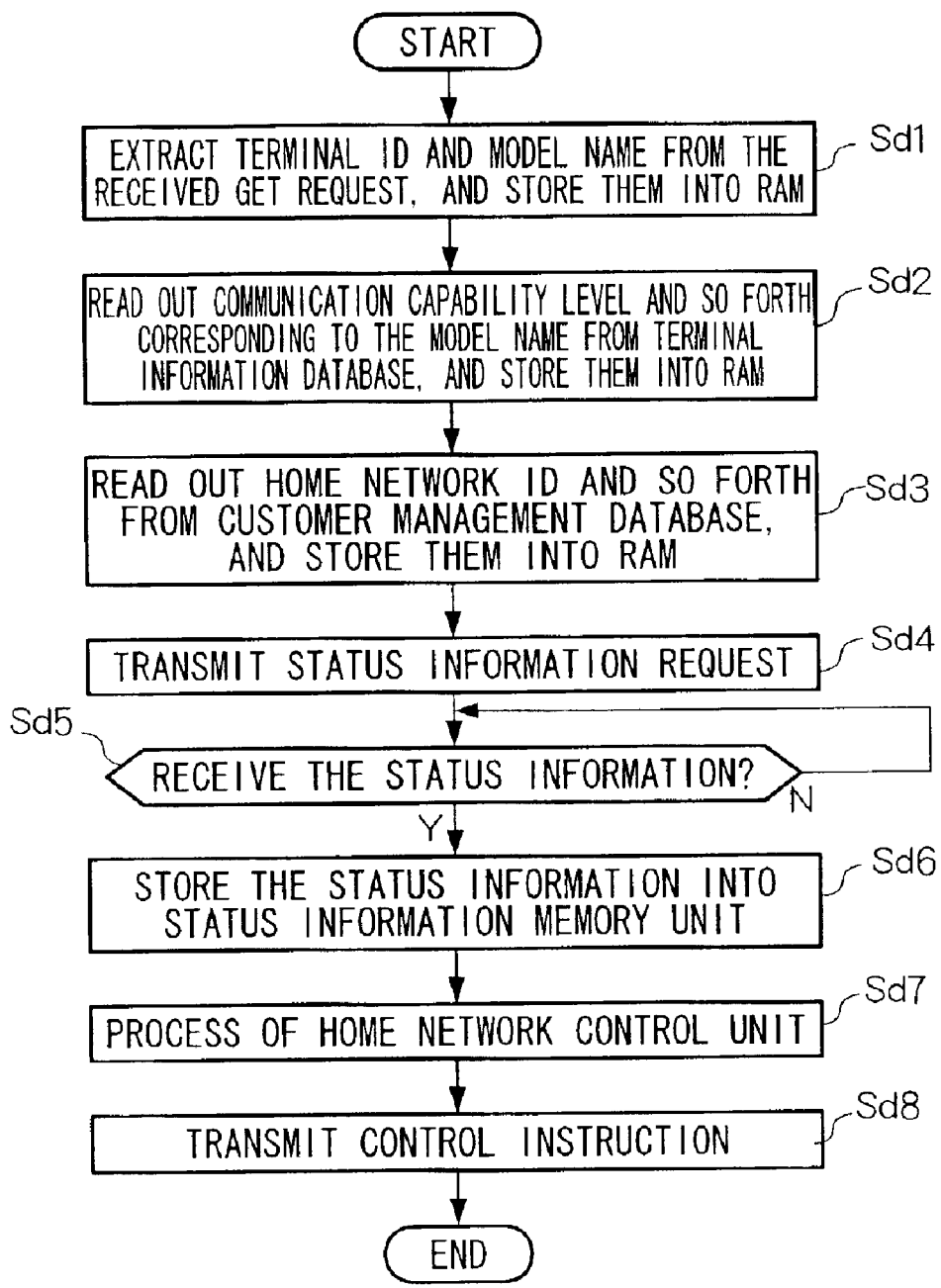
FIG. 18 is a flowchart illustrating the process of the system control unit of HTTP 51 in the operation example 1-a-2 according to this embodiment.

When GET request GR4 is received, in system control unit 511 in HTTP server 51, the process shown in a flow diagram in FIG. 18 gets started.

Firstly, system control unit 511 extracts the model name [model a] added to GET request GR4, and stores it in RAM. (Step Sd1 in FIG. 18).

Then, system control unit 511 reads out display capability level [level 1 in this case], communication capability level [level 1 in this case], and terminal communication standard [standard 1], each of which corresponds to the model name [model a], from terminal information database 516, and stores them in the RAM. (Step Sd2 in FIG. 18).

Next, system control unit 511 reads out a user ID [user. a] corresponding to a terminal ID [terminal a] stored in the RAM, and a home network ID [home. a], and security level [level 1] from customer management database 515, and stores them in the RAM.

At this point, the terminal ID [terminal a], the user ID [user. a], the security level [level 1], the home network ID [home. a], the model name [model a], the display capability level [level 1], the communication capability level [level 1], and the terminal communication standard [standard 1] are stored in the RAM of system control unit 511.

Figure 17:
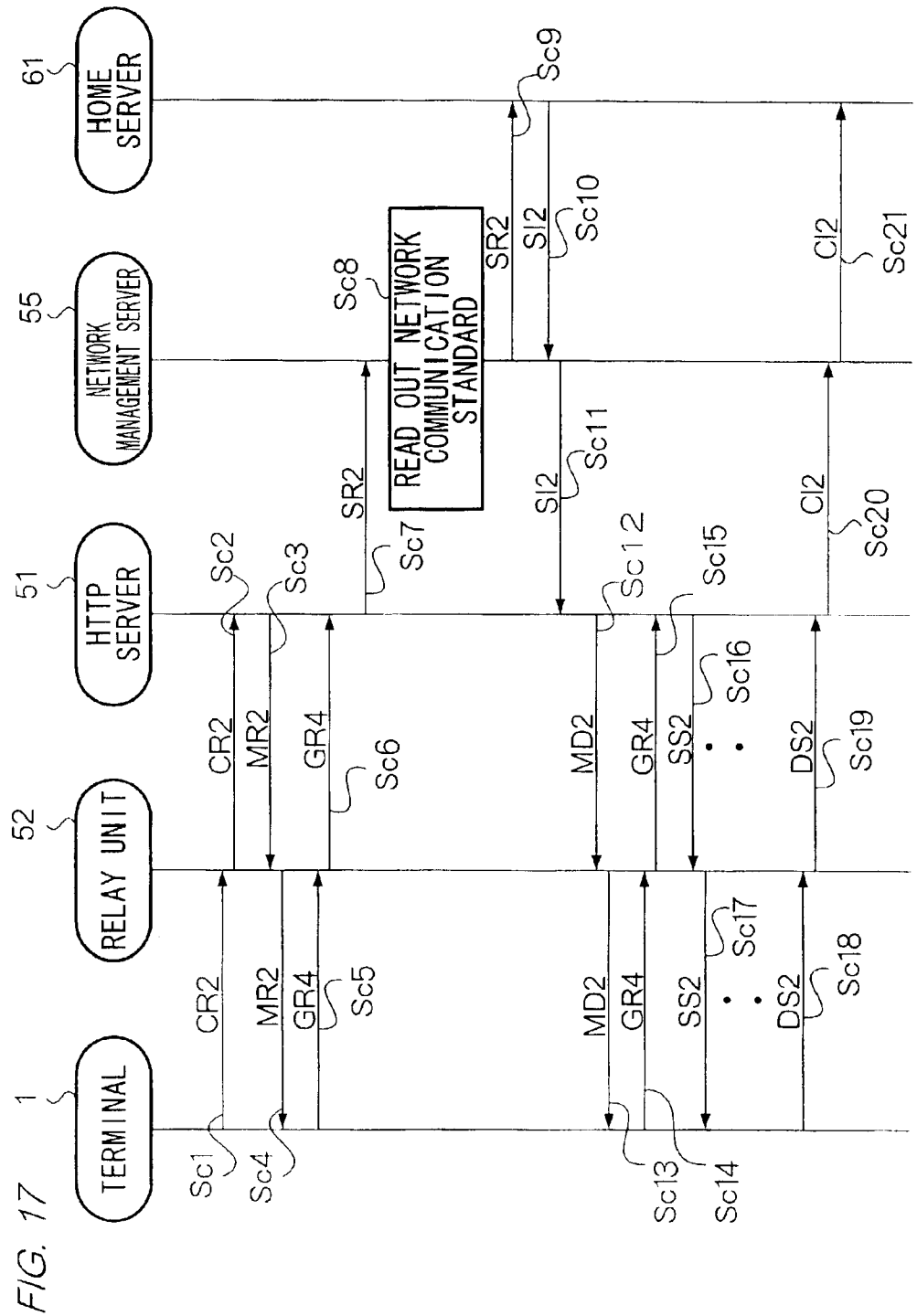
FIG. 17 is a diagram illustrating the sequence of the overall system in the operation example 1-a-2 according to this embodiment.

Once this various information has been stored in the RAM, the same process as that in Sa9-Sa19, as shown in FIG. 11, is performed in Sc7-Sc21, as shown in FIG. 17. Also, the same process as that in Sb10-Sb14, as shown in FIG. 13, is performed in Sd4-Sd8 in FIG. 18, as shown in FIG. 18.

As a result, home-located electronic device group 62 provided in home network 6, and security system 63 are controlled.

(b) An operation when an alarm from home network 6 is transmitted to a terminal 1.

Figure 19:
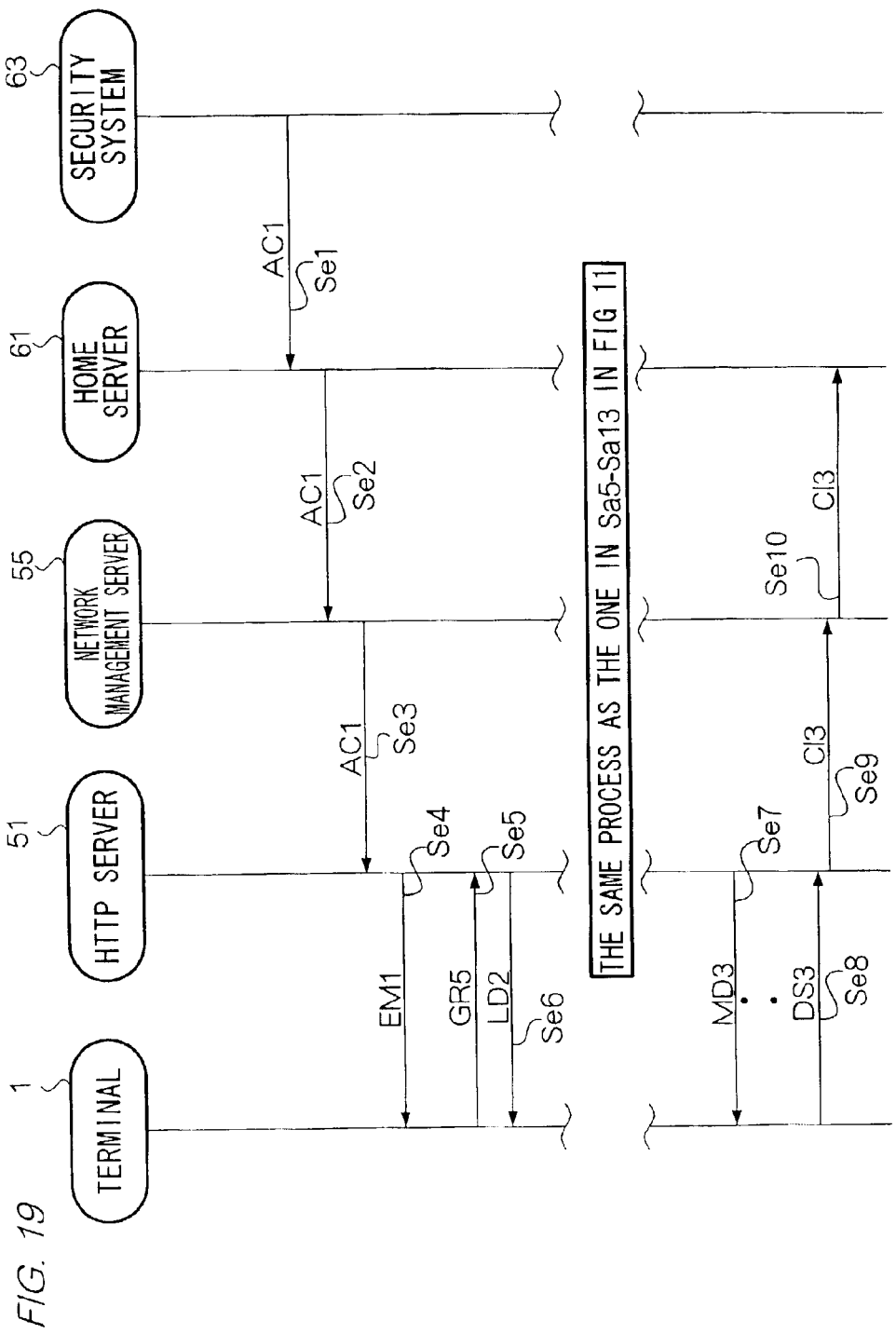
FIG. 19 is a diagram illustrating the sequence of the overall system in transmitting an alarm from home network 6 to terminal 1 according to this embodiment.

The operation which the alarm from home network 6 is transmitted to terminal 1 will be described with reference to FIG. 19.

Firstly, an object for detection is detected by security system 63 when the object gets in a designated status. Specifically, security system 63 detects an emergency, for example, that a door is open even though it is in lock status. When the emergency is detected, security system 63 transmits alarm AC1, which is an emergency signal, to home server 61. (Step Se1) At this point, security system 63 adds the details of the emergency (That is to say, a door is open even though it is in lock status.), which has happened in a house, and other information to alarm AC1.

Home network ID [home. a] is added to alarm AC1 by home server 61. Then, alarm AC1 is transferred to network management server 55, and transferred to HTTP server 51 by network management server 55. (Step Se2 and Se3).

System control unit 511 in HTTP server 51 extracts the emergency information from alarm AC1, and stores it in RAM when receiving alarm AC1. When an emergency occurs, to notify an alarm to a user of home network 6, the system control unit 511 generates electronic mail EM1, and transmits it to the terminal 1 corresponding to the home network ID [home. a] via the Internet 4. (Step Se4) At this point, the details of alarm AC1, and URL corresponding to a log-in screen of HTTP server 51 are provided in the electronic mail EM1 generated by system control unit 511.

Terminal 1 displays a picture corresponding to electronic mail EM1 on a display unit displayed in FIG. 20A when receiving electronic mail EM1. In this case, the alarm sound may be output in terminal 1 which electronic mail EM1 is received.

In this status, terminal 1 extracts the URL corresponding to the log-in data from received electronic mail EM1, and transmits GET request GR5 including the URL to HTTP server 51 via mobile packet communication network 2 when the user performs the input operation for selecting an instruction button of terminal 1, "Log in the home server". (Step Se5) At this point, terminal 1 adds its own model name to GET request GR5, and transmits it to HTTP server 51.

Next, system control unit 511 in HTTP server 51 generates log-in data LD2, and transmits it to terminal 1 via the Internet 4. (Step Se6) Then, the same process as that in Step Sa5-Sa13 in FIG. 11 is performed between the terminal 1 and home network server 5 when log-in data LD2 is transmitted.

Next, system control unit 511 in HTTP server 51 transmits menu data MD3 to the terminal 1. (Step Se7) At this point, system control unit 511 in HTTP server 51 modifies menu data MD3 depending upon the communication capability level and the display capability level of terminal 1. By the way, the operation for modifying the menu data depending upon the communication capability level and so forth is already described above, therefore, the explanation will be omitted.

Terminal 1 displays to the user, a picture shown in FIG. 20B for prompting to deal with the emergency. At this point, when the user performs the input operation for selecting "Alarm", terminal 1 extracts the URL corresponding to the alarm, and transmits a GET request including the URL to HTTP server 51. When system control unit 511 in HTTP server 51 receives the GET request, system control unit 511 inquires a service control station provided in mobile packet communication network 2 to obtain the house information, in whose home network 6 is installed, such as a person's name (the user in this case) living there, an address. Then, system control unit 511 in HTTP server 51 adds the name and address to the GET request, and transmits the GET request to a notification server 7. As a result, an alarm event is generated at a police station, or a security company, to enable a response from the appropriate service to be made. Therefore, the police or the security guard are able to go to the above house.

On the other hand, when the user performs the operation for "Lock again", terminal 1 extracts the URL corresponding to "Lock again", and transmits decision signal DS3 including the URL to HTTP server 51. (Step Se8) System control unit 511 in HTTP server 51 modifies status information memorized in status information memory unit 514 according to decision signal DS3 when receiving decision signal DS3. And, system control unit 511 transmits control instruction C13 to which the status information is added, to home server 61 via network management server 55. (Step Se9-Se10).

When control instruction C13 is received, control unit 611 in home server 61 extracts the status information from control instruction C13, and overwrites status information table 1-m. And, control unit 611 reads out driver software of home-located electronic device, and controls home-located electronic device followed by the modified status information. Thus, the door is locked again by security system 63.

In the home network management system according to the embodiment, the user obtains the status of the home-located electronic devices provided in the home network by letter information displayed on a display of terminal 1, and performs remote control. The remote operation by the home network management system according to the embodiment is not difficult, as compared with the operation by a conventional DTMF signal.

Also, as well as showing the status of the home-located electronic devices to a user, HTTP server 51 generates the information for displaying a picture prompting input of a control instruction for the home-located electronic devices, on a display unit of terminal 1 according to a HTML form. Accordingly, terminal 1 can perform remote control without having a software with regard to a special remote control function (e.g.: RAS) if it has a WWW browser which is fit for a wide range of users. In this way, remote control of the home-located electronic devices provided in the home network is performed even in the case that a simple terminal, such as a portable telephone or the like is used. Also, in performing remote control of the home-located electronic devices, it is not necessary for home server 61 to perform a process for showing the status of the home-located electronic devices one by one, for prompting the user to input the control instruction for the home-located electronic devices, and for performing direct data communication with terminal 1 for the above process. Thus, home server 61 may be simple. Further, remote control by the home network management system can save some cost which the user bears as home server 61 is not required to be connected to the Internet all the time.

Also, home network management facility 6 can surely show the status of the home network to a user of terminal 1 as the amount of the data which should be transmitted to terminal 1 is decided depending upon display capability and communication capability of terminal 1. Also, a log-in screen and a setting screen, which are transmitted to terminal 1, are generated in the same form by the HTTP server regardless of a model of the terminal. Accordingly, the user of terminal 1 can perform remote control of home-located electronic devices provided in the home network without uncomfortable feeling.

Also, in this embodiment when an emergency occurs in a house where home network 6 is installed, home server 61 transmits an alarm to home network management facility 5, and home network management facility 5 transmits an electronic mail to terminal 1 based on the alarm. Consequently, when an emergency occurs in a house where home network 6 is installed, details of the emergency are notified to the user of terminal 1.

Also, in this embodiment, home network management facility 5 notifies a police station or security company in response to an instruction from terminal 1 after notification of the alarm to the user of terminal 1. Therefore, the emergency notification is performed based on the intention of the user who manages the house.

Also, this embodiment shows that the status information stored in status information memory unit 514 in HTTP server 51 is obtained from home server 61 when access is performed from terminal 1. However, the status information can be shared by between home server 61 and HTTP server 51. In this case, if the status information in home server 61 is modified, the status information should be transmitted to HTTP server 51 from home server 61.

Also, with regard to generating HTML data, this embodiment shows that HTTP server 51 generates the HTML data for a screen corresponding to the URL, and transmits it to terminal 1 when URL is selected by a user every time, but the HTTP can be generated collectively. For example, HTTP server 51 may generate all the HTTP data with regard to remote control of home-located electronic devices in a hierarchical way after obtaining status information SI1 in Step Sa13, as shown in FIG. 11.

Also, to perform remote control of home-located electronic devices, in this embodiment HTTP server 51 modifies the status information according to an instruction from terminal 1, transmits to home server 61, a control instruction to which the modified status information is added. However, remote control of the home-located electronic devices may be performed by modifying the details of the control instruction without adding the status information.

Also, in this embodiment details of information to be notified to the terminal 1 is the emergency case when an event has happened to the home server 6. However, the details of information to be notified is not restricted to an emergency case, and may be an optional one selected by the user.

Also, in this embodiment HTTP server 51 memorizes the status information in status information memory unit 514 depending upon a security level of the user after abandoning the status information with regard to home-located electronic devices which the user is not permitted to perform remote control. Accordingly, the user cannot obtain the status information of the home-located electronic devices which are not permitted to be controlled remotely. However, with regard to the home-located electronic devices which are not permitted to be controlled remotely, HTTP server 51 may be one for generating the HTML data to show the status information to the user even though the home-located electronic devices are not controlled remotely by the user.

Also, in this embodiment home network management server 5 communicates with home server 61 via mobile packet communication network 2, however, a channel for communicating between the both servers may be wire or local network.

[1.3] Modifications

<Modification 1-1>

In this embodiment, customer management database 515 stores one home network ID and one security level, each of which corresponds to one user. That is to say, one user can control one home network 6 by using one terminal. However, the following modifications may be made.

FIG. 21 is a diagram illustrating the details of a memory of customer management database 515 according to the modification 1-1. As shown in the figure, the multiple home network IDs corresponding to each user ID and each terminal ID are provided in customer management database 515. Security levels corresponding to each home network ID are provided.

That is to say, in this modification, a home network management system is provided whereby multiple home networks 6 are controlled remotely by one terminal 1. In this modification, the home network ID is provided in a log-in screen in addition to a space for inputting the user ID and the password shown in FIG. 12. Then, control unit 511 in HTTP server 51 performs user authentication by transmitting the user ID transmitted from terminal 1, and the password to authentication server 54. Also, at this point, system control unit 511 reads out security level corresponding to the home network ID from customer management database 515. And, system control unit 511 controls home network 6 corresponding to an instruction from terminal 1 within a range of the security level.

For example, the following case is assumed as coverage of this modification. For example, a user independent of parents lives in a house or apartment, and looks after them. If the parents live in a different house or apartment, the user may prefer to perform remote control of the parent's house as well as that of the user.

In this modification, there are multiple home networks which a user can perform remote control, therefore, the user accesses home network management facility 5 by utilizing terminal 1 to control home-located electronic devices in home network 6 in their house.

<Modification 1-2>

In this embodiment, the data (e.g. log-in data or menu data) which should be transmitted to terminal 1 from HTTP server 51 is modified depending upon communication capability and display capability of the terminal 1. However, descriptions of a screen may be configured by a user's age or sex as well. That is to say, if the user is a small child, a decorative graphic and so forth may be added in the screen of the terminal 1.

In this case, a user's age is provided in the customer management database 515. Then, the data to which a decorative graphic appropriate for the age of the user is added is generated by taking the age into consideration when system control unit 511 in HTTP server 51 generates the data (e.g. corresponding to log-in data) which should be transmitted to terminal 1.

Also, in this embodiment, the information displayed on a display unit of terminal 1 is displayed in text form. However, it may also be displayed by GUI (graphical user interface).

<Modification 1-3>

In this embodiment, information such as a user's birthday is not provided in customer management database 515. But, security level may be modified automatically depending upon a user's age by providing a birth date in customer management database 515.

For example, a child lives in a house where a parent is a user of the system in which home network 6 is installed, and the parent sets the security system. By the time the child becomes a junior high school student, the parent may want to set the security level at level 2 In this case, the user's birth date, and age which is calculated from the birth date is provided in customer management database 515. Then, the security level corresponding to the user may be set automatically by HTTP server 5 at a time the child becomes a junior high school student. Also, by providing the birthday in customer management database 515, the data format may be modified by using the birth date when the data to be transmitted to terminal 1 is modified on the basis of the user's age like Modification 1-2 described above.

<Modification 1-4>

Also, in this embodiment, the home network management system for controlling home-located electronic device group 62 installed in a house is described among the remote control systems of the home-located electronic devices according to the present invention, however, the present invention is not restricted to the above system. That is to say, it may be a remote control system for home-located electronic devices which perform remote control of home-located electronic devices in a school or other building.

<Modification 1-5>

In this embodiment and the modifications described above, remote control of home-located electronic devices is performed after a user inputs [a user ID] and [a password] transmitted from the terminal 1 (That is to say, after a user authentication is performed), however, the present invention is not restricted to this example. For example, multiple home networks 6, which are capable of being controlled remotely by each terminal 1, may be memorized in to the home network management facility 5. Then, when a control request to which the terminal ID is added is executed at one terminal 1, home network 6 corresponding to the terminal ID may be controlled.

Also, the terminal IDs are added to the various information as identifiers, however, it is also not restricted to this example. The identifier may be a user ID or a home network ID.

[2] Second Embodiment

[2.1] Configuration of the Second Embodiment

The configuration of the remote control system according to this embodiment is the same one described in the first embodiment if it is not particularly shown, and the same operation is performed in the remote control system.

This embodiment comprises the following function in addition to the one described in the first embodiment. For example, when a user buys new home-located electronic device(s) provided in home network 6 installed in a user's house, the user is required to install new driver software corresponding to the new home-located electronic device(s) in home server 61 in home network 6.

In this embodiment, the user accesses home network management server 5 by utilizing terminal 1, and downloads the driver software corresponding to home-located electronic device(s) to home server 61.

Figure 22:
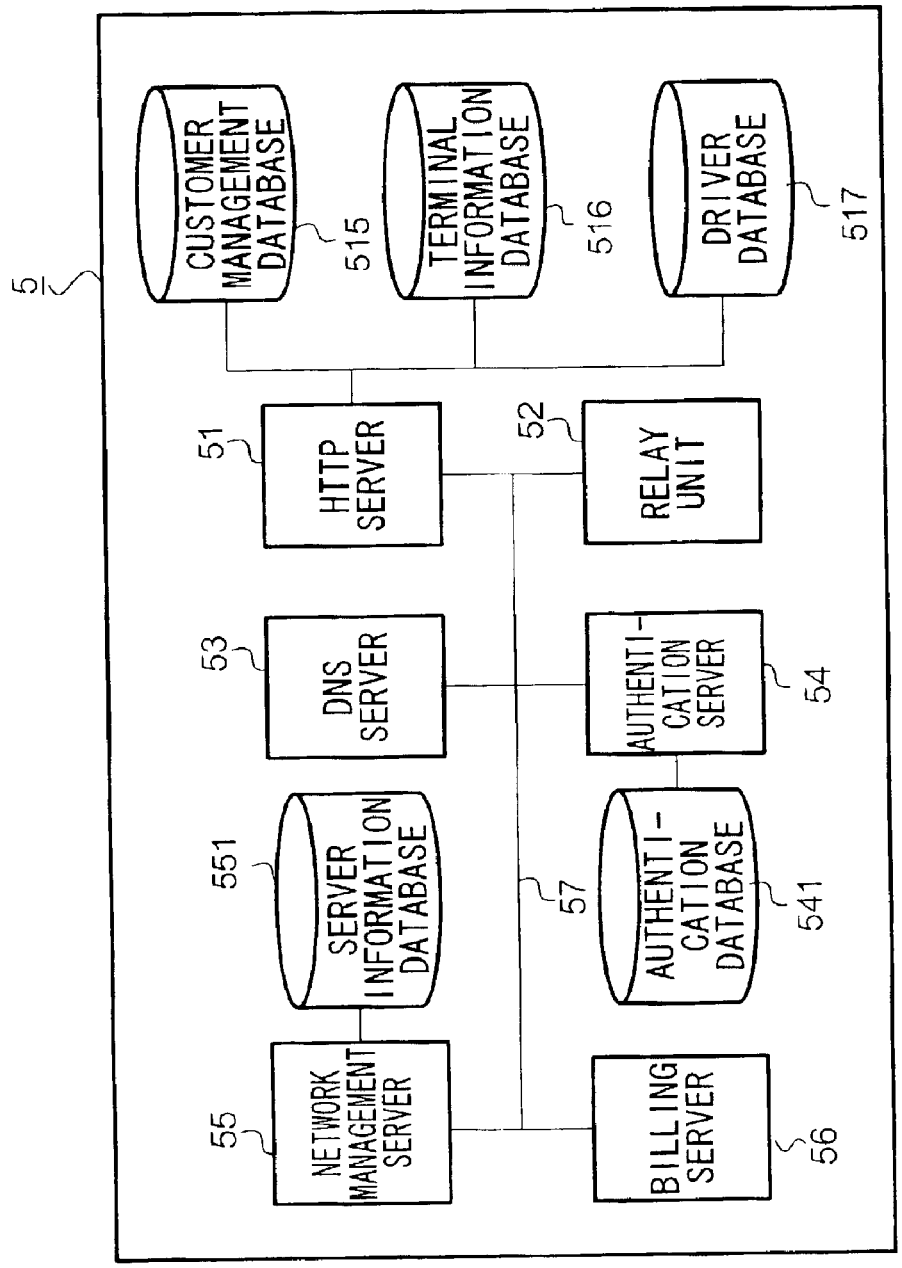
FIG. 22 is a block diagram illustrating the configuration of home network management 5 facility according to the second embodiment.

To achieve the above function, home network management server 5 according to this embodiment has a configuration shown in FIG. 22. As shown in this figure, the same numerals are attached with regard to the same elements in FIG. 4.

Figures 23, 24:
FIG. 23 is a diagram illustrating the details of memory function of driver database 517 according to this embodiment.
FIG. 24 is a diagram illustrating an example of the menu screen displayed on a display unit of terminal 1 according to this embodiment.

As shown in this figure, home network management server 5 according to this embodiment comprises driver database 517, and driver database 517 is connected to HTTP server 51. FIG. 23 shows the details of memory in driver database 517. As shown in this figure, the driver software for the model corresponding to the model name of each home-located electronic device is provided in driver database 517. Also, the driver software corresponding to most of the home-located electronic devices provided in the market is provided in driver database 517. Also, URL for specifying resource position of each driver software is set in each driver software provided in driver database 517.

Also, ROM comprises various information and a control program in the first embodiment described above, and a program for downloading the driver software to home server 61 based on a request from the terminal 1 is provided in ROM in addition.

System control unit 511 downloads the driver software corresponding to the request from terminal 1 to home server 61 by performing the program.

The billing data stored in billing server 56 is accumulated as content transmission charge every time when the driver software is downloaded, apart from the management charge described above.

[2.2] Operation of the Second Embodiment

In this embodiment, (a) the operation when the remote control of home network 6 is performed by utilizing terminal 1, (b) the operation when an alarm is transmitted from home network 6 to terminal 1, the both operations are completely the same as that described in the first embodiment, therefore, the only different operations from the first embodiment will be described.

(c) The operation when the driver software is downloaded by utilizing terminal 1.

The difference of a communication channel between terminal 1 and home network management facility 5, that is to say, by whether it is downloaded via the Internet 4 or via mobile packet communication network 2, there are two operation examples. But, apart from the authentication process in home network management facility 5, there are no differences in these examples like the operation examples of 1-a-1 and 1-a-2 described above. Therefore, the example that the access is made to HTTP server 51 in home network management facility 5 via the Internet 4 will be described. Also, the tasks are required that a new home-located electronic device is added to home-located electronic device group 62, or the old home-located electronic device is changed to the new device before this operation; but it is assumed that the above tasks have already been performed.

Firstly, when a user performs input to perform browsing by operating an instruction input unit of terminal 1, WWW browser is read out according to the input instruction. Then, terminal 1 performs a packet registration to mobile packet communication network 2. Also, when direct communication with relay unit 52 is performed by terminal 1 via the mobile packet communication network 2, the WWW browser is read out for communication with relay unit 52.

The authentication process carried out by the user of terminal 1 is performed in home network management facility 5 by performing the same process as that one in Sa1–Sa13 in FIG. 11 (Sc1–Sc11 in FIG. 17 when direct communication with relay unit 52 is performed by terminal 1). Accordingly, status information in home server 61 is shared by HTTP server 51.

Next, system control unit 511 in HTTP server 51 transmits the menu data to terminal 1. At this point, the menu items shown in the first embodiment, and the menu item stating [Click here for downloading the driver software] are included in the menu data transmitted from system control unit 511. An example of a picture displayed on a display unit of the terminal 1 is described in FIG. 24 when the menu data is received by terminal 1.

When the user performs an input operation to select the menu item stating "Click here for downloading the driver software" to an instruction input unit of terminal 1 in the status displaying the picture, A character string, "Click here for downloading the driver software", is highlighted. At this point, when the user performs input operation to decide the menu item, system control unit 511 extracts URL corresponding to the menu item, and transmits a GET request including the URL to HTTP server 51 via mobile packet communication network 2.

Next, when the GET request is received by HTTP server 51, system control unit 511 in HTTP server 51 extracts URL from the GET request. Then, system control unit 511 verifies that the HTML data which should be transmitted to terminal 1 from the URL corresponds to the data stating "Click here for downloading the driver software".

Next, system control unit 511 in HTTP server 51 reads out the model name of home-located electronic device stored in driver database 517, generates the HTML data including the model name of home-located electronic device, and transmits the HTML data to terminal 1. It is to be noted that the URL corresponding to each driver software corresponds to model names of each home-located electronic device.

A list of the model names of the home-located electronic devices which can be downloaded, that is to say, the list of the model names of the home-located electronic devices shown in FIG. 23, is displayed on the display unit of terminal 1. In this status, when [Model a of an home-located electronic device] is selected by input operation, the terminal 1 extracts the URL corresponding to [Model a of an home-located electronic device], and transmits the GET request including the URL to HTTP server 51.

When the GET request transmitted from terminal 1 is received by HTTP server 51, system control unit 511 in HTTP server 51 extracts the URL including the GET request. Then, system control unit 511 reads out [Driver a] from driver database 517 according to the URL, and stores [Driver a] in RAM. Also, system control unit 511 generates the HTML data for displaying a screen to prompt the user to decide, and transmits the HTML data to terminal 1.

As a result, the a question such as [Do you wish to download the driver software corresponding to "Model a of an home-located electronic device"?] is displayed on the display unit of terminal 1. And, when the user pushes an ENTER key in the instruction input unit of terminal 1, terminal 1 transmits to HTTP server 51, a notification which approval is performed to mobile packet communication network 2 (hereafter referred to as an approval notification).

System control unit 511 in HTTP server 51 transmits to billing server 56, a message stating the driver software is downloaded along with the home network ID when receiving the approval notification. As a result, in billing server 56, billing data corresponding to content transmission charge is generated each time the driver software is downloaded, and the billing data is updated in a cumulative way.

Also, system control unit 511 in HTTP server 51 reads out [Driver a] stored in RAM. And, this [Driver a] is transmitted to home server 61 via network management server 55 by system control unit 511. Then, control unit 611 in home server 61 installs the driver software transmitted from network management server 55 on the hard disk owned by control unit 611.

Thus, in this embodiment, driver software for the home-located electronic devices is downloaded by accessing HTTP server 51 by utilizing terminal 1. Therefore, the user can update the driver software in home server 61 without complicated process even though the home-located electronic devices in home server 6 are changed.

In this embodiment, HTTP server 51 reads out every model name of the home-located electronic devices provided in the driver database, generates the HTML data including home-located electronic device, and performs transmission. However, a picture corresponding to a screen for inputting the model name of terminal 1 may be transmitted to the user of terminal 1 instead of transmitting the HTML data. In this case, system control unit 511 in HTTP server 51 searches the details of driver database 517 based on the model name transmitted from the terminal 1. Also, the model name may be searched from a maker name by providing a model name corresponding to a maker name.

[3] Third Embodiment

[3.1] Configuration of the Third Embodiment

Figure 25:
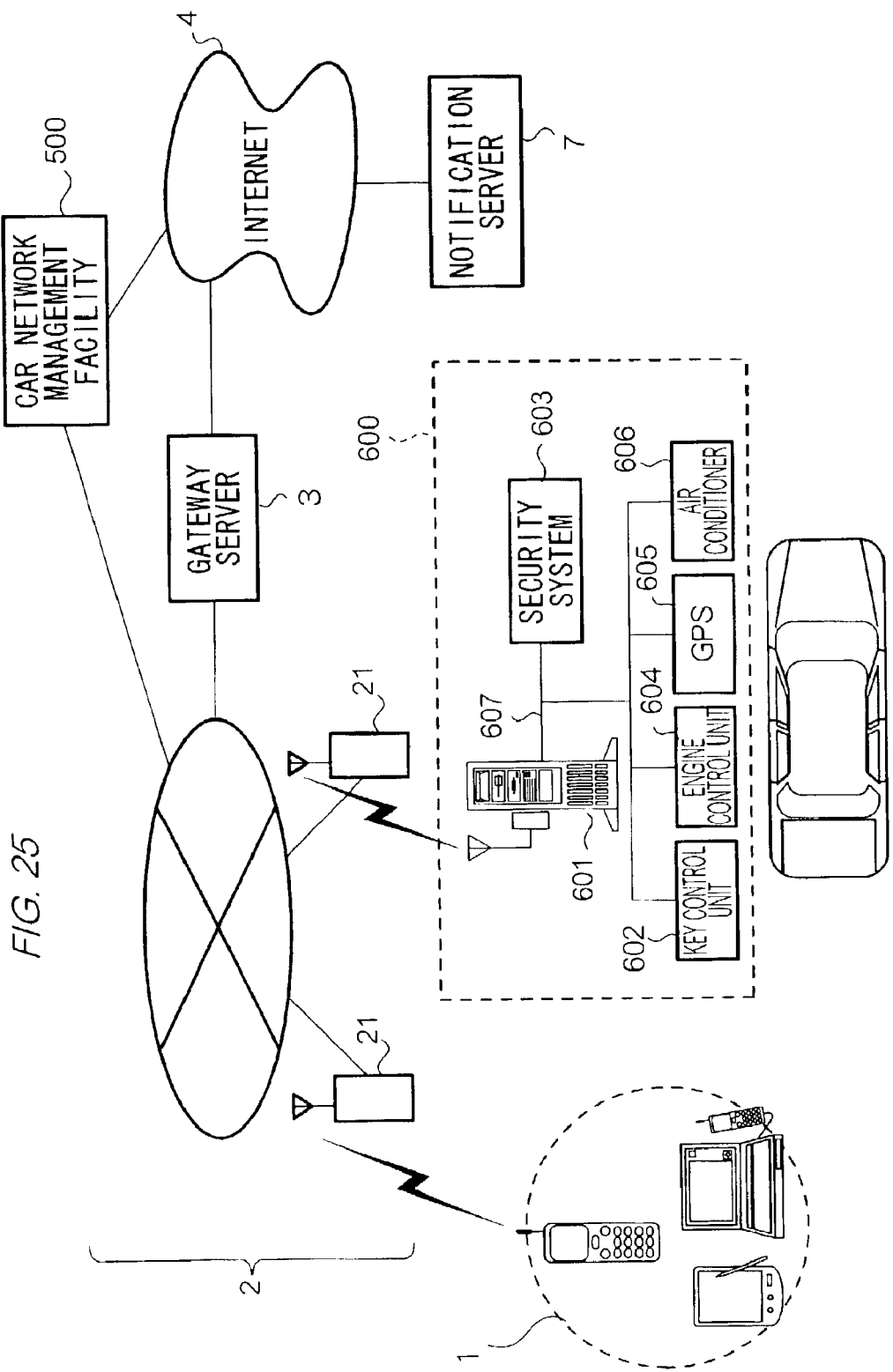
FIG. 25 is a block diagram illustrating the configuration of the remote control system according to the third embodiment.

FIG. 25 is a block diagram illustrating the configuration of the remote control system in this embodiment. As shown in this figure, the same numerals are attached with regard to the same elements in the FIG. 1.

As shown in this figure, the remote control system comprises car network management unit 500, and car network 600.

Car network 600 is the network provided in a car; and comprises car server 601, key control unit 602, security system 603, engine control unit 604, GPS (Global Positioning System) 605, air conditioner 606, and bus 607 which connects these mutually.

Key control unit 602 authenticates a key being inserted into a key cylinder. The unit is connected to a starter of the engine, and detects whether the engine has been started. The way to authenticate the key being inserted into the key cylinder can be selected. For example, IC is provided in the key, and a body number of the car and so forth are memorized in the IC. Then, the authentication is performed by verifying whether the body number matches that which key control unit 602 comprises.

Engine control unit 604 is the unit to control an injection system; and controls the amount of gasoline and air which should be provided to a combustion chamber by opening an accelerator and so forth.

GPS (Global Positioning System) 605 calculates the position of a car by latitude and longitude; and generates location information corresponding to the position of the car.

Also, key control unit 602, security system 603, engine control unit 604, GPS (Global Positioning System) 605, and air conditioner 606 have a communication function, and communicates with car server 601 via bus 607.

Security system 603 performs the process to modify lock status and so forth according to an instruction from car server 601, monitors the changes in the car, and transmits an alarm to car server 601 when an emergency happens. The alarm to be transmitted to car server 601 from security system 603 are as follows:

(1) Burglar Alarm

The burglar alarm is the alarm transmitted to car server 601 from security system 603 when the engine starts in the status that the authentication is not performed, or a window pane of the car is broken.

(2) Accident Alarm

The accident alarm is an alarm transmitted to car server 601 from security system 603 when an accident involving a vehicle occurs. Security system 603 detects that an accident has happened when acceleration of gravity above designated threshold is detected, and transmits this alarm to car server 601.

Car server 601 is the same configuration as home server 61 shown in the first embodiment, and manages home-located electronic devices installed in the vehicles (hereafter referred to as in-vehicle devices), such as key control 602, security system 603, engine control unit 604, GPS 605, and air conditioner 606. Also, in-vehicle devices are not restricted to the above home-located electronic devices. At this point, in the configuration of car server 601, the only different point from home server 61 according to the first embodiment is the status information provided in status information table memory unit 614.

FIG. 26 is a diagram illustrating status information table TBL2-$m$ ($m=1-k$) provided in status information table memory unit 614 in car sever 601. As shown in this figure, the status information corresponding to each in-vehicle device is provided in status information table memory unit 614 according to this embodiment. As compared with the first embodiment, the status information tables TBL2-4 with regard to GPS 605 are characteristic among the status information tables TBL2-$m$. The location information of a car obtained by GPS 605 is provided in the tables TBL2-4 by latitude and longitude.

Also, when car server 601 receives an alarm from security system 603, car server 601 transfers the alarm to car network management unit 500 like the first embodiment. Also, car server 601 transmits the alarm to car server management unit 500 voluntarily when detecting a car with headlights on. It is optional how car server 601 is installed. For example, a function of car server 601 may be installed in a navigation device.

Car network management unit 500 has the same configuration as that in home network management unit 5 according to the first embodiment, and performs the same process as well. In car network management unit 500, different point from home network management unit 5 is that the information is related to car network 600 instead of home network 6. For example, a network communication standard provided in server information database 551 is modified to network communication standard corresponding to car server 601 from the network communication standard corresponding to home server 61. (Please refer to FIG. 10) Also, the status information provided in status information memory unit 514 in HTTP server 51 corresponds to each in-vehicle device. (Please refer to FIG. 7) Further, the home network ID [home. a], [home. b] and so forth become a car network ID [car. a], [car. b] and so forth with regard to the information provided in customer management database 515. Since the only differences between such information and that in the first embodiment involves names and the like, detailed description will be omitted.

In this embodiment, a security level set for each user is not provided among the information provided in customer management database 515 in the first embodiment

[3.2] Operation of the Third Embodiment

The operation of this embodiment will be described as follows:

(a) The operation when remote control of car network 600 is performed by utilizing terminal 1 and, (b) The operation when an alarm is transmitted to terminal 1 from car network 600.

(a) The operation when remote control of car network 600 is performed by utilizing terminal 1.

The difference of a communication channel between terminal 1 and car network management facility 500, that is to say, by whether it is transmitted via the Internet 4 or via mobile packet communication network 2, will now be explained. There are two operation examples. Since the differences between these examples are described in the first embodiment, an example wherein remote control of a car network 600 is performed via the Internet 4 will be described.

Firstly, when a user performs input to perform browsing by operating an instruction input unit of terminal 1 (not shown here), WWW browser is read out in terminal 1 according to the input instruction. Then, terminal 1 performs a packet registration to mobile packet communication network 2. Thus, when the packet registration is performed, in the remote control system according to this embodiment, the same process as that in step Sa1–Sa13 in FIG. 11 described above is performed, and in the system control unit 511 in HTTP server 51, the same process as that in the step Sb1–Sb11 in FIG. 13 described above is performed.

Thus, when the status information is stored in status information memory unit 514 in HTTP server 51, HTTP server 51 transmits menu data to terminal 1. Then, the process for performing remote control of the in-vehicle devices (hereafter referred to as [car network control process] installed in car network 600 is performed in between terminal 1 and HTTP server 51.

FIGS. 27A, 27B, 27C, 27D, 27E, 27F, 27G, 27H, 27I, 27J, 27K, 28A, 28B, 28C, 28D, and 28E are diagrams illustrating an example of the transition of the pictures displayed on the display unit of terminal 1.

Firstly, menu data is received by terminal 1, menu items in FIG. 27A are displayed on a display unit of terminal 1. In this status, when a user performs input operation to select the menu item [Light] to instruction input unit of terminal 1, URL corresponding to the menu item from the menu data is extracted in terminal 1. Then, terminal 1 transmits a GET request including the URL to HTML server 51. And, ON/OFF status is switched by a predetermined input operation. (Please refer to FIGS. 27H, 27I, 27J, and 27K).

Also, when [Security System] is selected, the screens displayed on terminal 1 change (Please refer to FIGS. 27B, 27C, and 27D), and when [Air Conditioner] is selected, the screens displayed on the display unit of terminal 1 change (Please refer to FIGS. 27E, 27F, and 27G). FIGS. 28A, 28B, 28C, 28D, and 28E go through the same process as well. As a result, the status information stored in status information memory unit 514 in HTTP server 51 is modified. Since the process performed in the car network control process is the same as that performed in the first embodiment, its detailed description is omitted.

Thus, when the status information stored in status information memory unit 514 in HTTP server 51 is modified, HTTP server 51 transmits a control instruction including the modified status information to car server 601. And, car server 601 performs control of the in-vehicle devices by following the control instruction.

(b) The operation when an alarm is transmitted to terminal 1 from car network 600.

In this operation, there are three operation examples depending upon the details of emergency which has occurred in car network 600. Each operation will be described below.

OPERATION EXAMPLE 3-b-1

This operation example is performed when a burglar alarm is transmitted from security system 603 to car server 601.

Figure 29:
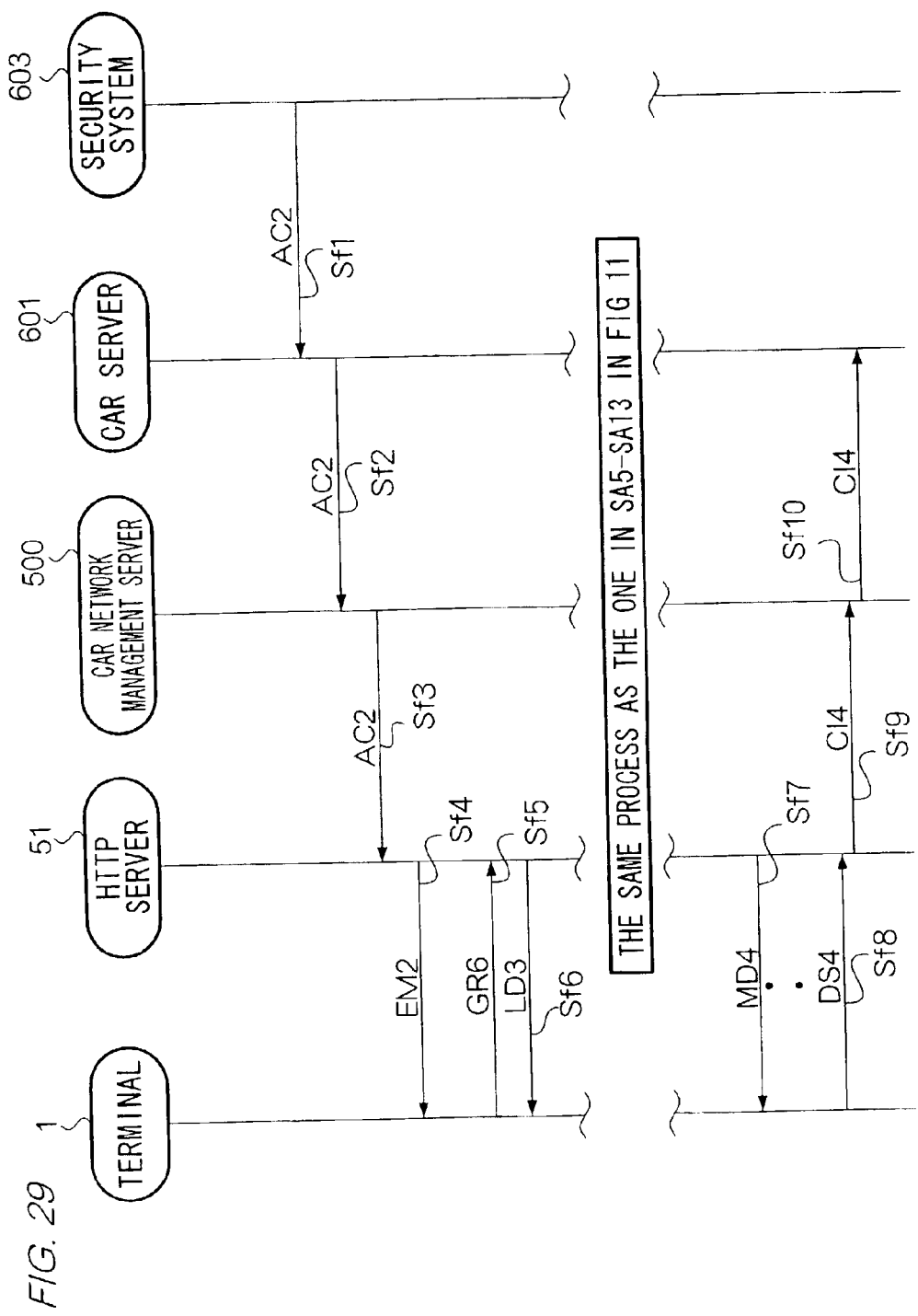
FIG. 29 is a diagram illustrating the sequence of the overall system of transmitting an alarm from car network 600 to terminal 1 according to this embodiment.

FIG. 29 is a diagram illustrating the process in this operation.

Firstly, a burglar has broken in a car, and starts the engine of the car by using a duplicate key. In this case, key control unit 602 notifies a message, [The engine has started in a status in which key authentication is not performed.] to security system 603. Security system 603 transfers an alarm AC2 to car server 601 after receiving this notification. (Step Sf1).

Further, this alarm AC2 is transferred to car network management server 500 by car server 601, and transferred to HTTP server 51 by car network management server 500. (Step Sf2, Sf3).

System control unit 511 in HTTP server 51 extracts the details of the emergency from the alarm AC2 after receiving the alarm AC2, and stores the details in RAM. Then, system control unit 511 generates an electronic mail EM2 corresponding to the details of the alarm AC2, and transmits the electronic mail EM2 to terminal 1. (Step Sf4) Likewise the first embodiment, URL corresponding to log-in data of HTTP server 51 is included in the electronic mail EM2.

As shown in FIG. 30A, in terminal 1, a screen corresponding to the electronic mail EM2 is displayed on a display unit after receiving the electronic mail EM2. By watching this screen, the car user becomes aware that the car is stolen.

In this status, when the user performs an input operation to select a character string, [Log in to car server] by operating an instruction input unit of terminal 1, the character string is highlighted in terminal 1. Then, when the user performs input operation to make a decision to the instruction input unit of terminal 1, terminal 1 extracts URL corresponding to the log-in data from the received electronic mail EM2, and transmits a GET request GR6 including the URL to HTTP server 51 via mobile packet communication network 2. (Step Sf5) In this case, the terminal 1 adds its own model name to the GET request GR6 when transmitting the GET request GR6 to HTTP server 51.

Next, system control unit 511 in HTTP server 51 generates log-in data LD3, and transmits the log-in data LD3 to terminal 1 after receiving the GET request GR6. (Step Sf6) When the log-in data is received, the same process as that in Sa5-Sa13 in FIG. 11 is performed between terminal 1 and car network management facility 500.

Next, system control unit 511 in HTTP server 51 transmits menu data MD4 to terminal 1. (Step Sf7) And, as shown in FIG. 30C, terminal 1 displays menu items, which can be performed by the user, on the display unit when receiving the menu data MD4.

In this status, when the user performs the input operation to select [Notify the police], terminal 1 transmits to HTTP server 51, a decision signal DS4 including the URL corresponding to [Notify to the police]. (Step Sf8) System control unit 511 in HTTP server 51 reads out information corresponding to GPS 605 from among the status information stored in status information memory unit 514, that is to say, location information. System control unit 511 in HTTP server 51 transmits to notification server 7, a notification along with this location information. As a result, an event for which the notification is performed is generated at a police station, or a security company. Accordingly, policemen or security guards will be able to determine on the basis of the location information transmitted to notification server 7, a location of the stolen car.

Also, when the user performs the input operation to select a menu item, [Check Location information] to the instruction input unit of terminal 1, control unit 511 in HTTP server 51 reads out the location information stored in status information memory unit 514, generates HTML data by following the location information, and transmits the HTML data to the terminal 1. As a result, a screen shown in FIG. 30D is displayed on the display unit of terminal 1.

On the other hand, when the user performs the input operation to select an menu item [Compulsory Engine Lock] to the instruction input unit of terminal 1, terminal 1 transmits to system control unit 511 in HTTP server 51 via mobile packet communication network 2, the decision signal DS4 including URL corresponding to [Compulsory Engine Lock] (Step Sf8). System control unit 511 in HTTP server 51 modifies the status information memorized in status information memory unit 514 by following the decision signal DS4 transmitted from terminal 1. Then, system control unit 511 transmits to car server 601 via car network management server 500, a control instruction C14 to which the modified information is added (Step Sf9, 10).

Control unit 611 in car server 601 extracts the status information from the received control instruction C14, and overwrites the status information table TBL2-*m*. Then, control unit 611 performs control of engine control unit 604 by following the status information. It can also be conceived that electronic locking of an engine to thereby stall the engine be carried out. In this case, engine control unit 604 stops supplying gasoline to the engine. Also, it is preferable to be able to control speed which keeps below specified speed (e.g.: 10 km/h ) In this case, engine control unit 604 controls an injector to prevent supply above a predetermined amount of either one of gasoline or air, or both to an engine.

OPERATION EXAMPLE 3-b-2

This operation example is performed when, for example, a car with its headlights on is detected in car server 601. Basically, this operation example is the same as that in operation example 3-b-1 described above. Therefore, only those points which differ from the operation example 3-b-1 will be described.

Firstly, when a user stops an engine with headlights turned on, in car server 601, the time which system control unit 611 stops the engine is stored in RAM. At this point, car server 601 receives a control instruction from car network control unit 500 within the designated time stored in RAM, turns the headlights off by following this control instruction, and erases the time stored in RAM.

On the contrary, when the control instruction [Turn the headlights off] is not transmitted from car network control unit 500 within the designated time (e.g. 10 minutes) stored in RAM, car server 601 transmits an alarm to car network control unit 500. When car network control unit 500 receives this alarm, the same process as that in Step Sf4–Sf8 in FIG.

29 is performed. An example of a picture, which corresponds to an electronic mail EM2, displayed on the display unit of terminal 1 will be shown in FIGS. 31A and 31B. As shown in this figure, when the electronic mail EM corresponding to the alarm is transmitted from HTTP server 51, the screen shown in FIG. 31A is displayed on the display unit of terminal 1, and it gives a caution to the user. And, when the control instruction is transmitted from HTTP server 51 by performing the car network control process described above, car server 601 turns the headlights off by following the status information attached to the control instruction, and erases the time stored in RAM.

OPERATION EXAMPLE 3-b-3

This operation example is performed when an alarm at the time of an accident is transmitted from car server 601.

Firstly, when a collision occurs between cars, acceleration of gravity above designated threshold is detected in security system 603. In this case, security system 603 transmits the alarm at the time of an accident to car server 601. In this case, the various information may be attached to the alarm at the time of an accident transmitted from security system 603 to car server 601. For example, a sphygmometer is installed on a seatbelt to get a user's pulse, and the user's pulse may be attached to the alarm in transmission.

Car server 601 transfers to HTTP server 51 via car network management facility 500, the alarm at the time of an accident to which location information (the status information corresponding to GPS 605 among the status information stored in status information table 614) is added. When system control unit 511 in HTTP server 51 verifies that the transmitted alarm AC is the alarm at the time of an accident, system control unit 511 extracts the location information from the received the alarm at the time of an accident, and notifies the location information to notification server 7. By the way, if the information, such as the user's pulse, is added to the alarm at the time of an accident, system control unit 511 transmits this information to notification server 7.

As a result, an event for which the alarm has been notified is generated at a police station, or a security company. Thus, the police or security guards are able to determine from the location information transmitted from notification server 7, a location of a car involved in an accident. Also, if health status information, such as the user's pulse is included in data transmitted as an alarm at the time of an accident, rapid notification to emergency services can be made.

Thus, when an emergency happens in a car, the details are transmitted to the terminal of a user in this embodiment. Therefore, if a user's car is stolen, that user will be able to take prompt and effective action. Further, in the case that an engine is electronically locked a stolen car can be prevented from being moved to a location far from an place where, for example, an accident occurs. In addition, since HTTP server 51 obtains location information on a car, and notifies this information to, for example, the police. Therefore, any accident or other alarm event can be dealt with rapidly.

<Modification 3-3>

In this embodiment, in-vehicle devices installed in the car network system are remotely controlled by utilizing terminal 1. However, a motorbike network may be performed by installing the same system in a motorbike. This application is one which would have obvious benefit due to the high theft rate for motorbikes.

What is claimed is:

1. A method for remote control of home-located electronic devices, comprising the steps of:

receiving, at a management facility, from a terminal via a network, a request signal and a terminal identifier that identifies said terminal;

identifying, in said managing facility a server, said server being identified by a server identifier that corresponds to said terminal identifier;

obtaining, in said management facility, from said server via said network, status information and said server identifier, said status information indicative of the status of home-located electronic devices controlled by said server;

generating display information for said terminal dependent upon the performance of said terminal, wherein said display information includes the status of said home-located electronic devices based on said status information and a prompt for input of a control instruction for said home-located electronic devices, said terminal being identified by said terminal identifier, said terminal identifier corresponding to said server identifier;

transmitting said display information from said management facility to said terminal;

displaying, with said terminal, a screen showing the status of said home-located electronic devices and a screen to prompt for input of a control instruction of said home-located electronic devices on the basis of the received display information;

transmitting, by said terminal, said terminal identifier and first control information;

generating, by said management facility, second control information that directs said server to perform control of said home-located electronic devices, on the basis of said first control information;

transmitting, by said management facility, said second control information to said server, said server being identified by said server identifier that corresponds to said terminal identifier, and controlling, by said server, said home-located electronic devices on the basis of said second control information.

2. A method for remote control of home-located electronic devices according to claim 1, wherein said management facility generates said display information depending upon the communication capability of said terminal, said terminal being identified by a terminal identifier, said terminal identifier corresponding to said server identifier.

3. A method for remote control of home-located electronic devices according to claim 1, wherein said management facility modifies the size of a picture, a number of display colors, a number of gradations, and a data format for said display information dependent upon the display capability of said terminal, said terminal being identified by a terminal identifier, said terminal identifier corresponding to said server identifier.

4. A method for remote control of home-located electronic devices according to claim 1, wherein said management facility generates the same display information to be displayed on display screens of terminals that perform differently.

5. A method for remote control of home-located electronic devices according to claim 1, wherein said terminal identifier and said server identifier are the same.

6. A method for remote control of home-located electronic devices according to claim 1, wherein said management facility generates said display information based on at least one of a user's age or sex.

7. A method for remote control of home-located electronic devices according to claim 1,
wherein said server is able to control at least one control item of at least one home-located electronic device; and
said management facility stores a security level indicative of said at least one control item that said user is permitted to control,
said method further comprising the step of said management facility excluding from said generated display information prompts to input control instructions of said home-located electronic devices that are for at least one control item outside of said security level.

8. A method for remote control of home-located electronic devices according to claim 7, wherein said management facility configures said security level based on said user's age.

9. A method for remote control of home-located electronic devices according to claim 1, wherein said server and said home-located electronic devices are installed in a house used by said user, and configured in a local network in said house.

10. A method for remote control of home-located electronic devices according to claim 1, wherein said server and said home-located electronic devices are installed in a vehicle used by said user, and said server configures a local network in said vehicle.

11. A method for remote control of home-located electronic devices according to claim 1, wherein an engine control unit for controlling an amount of at least one of gasoline or air supplied to an engine of a vehicle is included in said home-located electronic devices; and
said server controls said engine control unit to control the amount of at least one of gasoline or air supplied to said engine based on said second control information.

12. A method for remote control of home-located electronic devices according to claim 1,
wherein a location information unit for obtaining location information of a vehicle is included in said home-located electronic devices; and
wherein said server controls said location information unit for obtaining location information of said vehicle based on said second control information.

13. A method for remote control of home-located electronic devices according to claim 1, further comprising the step of transmitting, by said management facility, said second control information, and charging said user when said server transmits a notification that designated control is performed by said second control information.

14. A method for remote control of home-located electronic devices according to claim 1, wherein said management facility transmits said second control information to said server via a mobile communication network.

15. A method for remote control of home-located electronic devices according to claim 1, wherein:
said management facility is connected to a mobile communication network; and
said terminal transmits first control information to said management facility via said mobile communication network.

16. A method for remote control of home-located electronic devices, comprising the steps of:
transmitting from one of a plurality of home-located electronic devices an emergency signal to a server via a local network when said one of said home-located electronic devices detects that an object is in a designated status for detection;
transmitting from said server to a management facility an alarm showing an emergency and a server identifier that identifies said server;
generating, with said management facility, for display on a screen of a terminal, display information that provides alarm notification and a prompt for input of a control instruction for said home-located electronic devices on the basis of said alarm, said terminal being identified by a terminal identifier that corresponds to said server identifier;
accessing a stored capability of said terminal based on said terminal identifier to determine at least one of a display capability or a communication capability of said terminal;
formatting said display information on the basis of at least one of said display capability or said communication capability of said terminal;
transmitting said formatted display information from said management facility to said terminal;
displaying, with said terminal, a screen that includes alarm notification and a prompt to input a control instruction for said home-located electronic devices on the basis of said received display information;
transmitting from said terminal to said management facility a terminal identifier and first control information, said terminal identifier identifying said terminal;
generating, with said management facility, second control information on the basis of said first control information, wherein said second control information directs said server to control said home-located electronic devices;
transmitting from said management facility to said server said second control information, said server being identified by said server identifier corresponding to said terminal identifier; and
controlling said home-located electronic devices on the basis of said second control information with said server.

17. A method for remote control of home-located electronic devices according to claim 16, wherein said method further comprising the step of said management facility transmitting said alarm to a predetermined notification place when transmittal of said alarm to said predetermined notification place is elected on the basis of a prompt displayed as part of said display information.

18. A method for remote control of home-located electronic devices according to claim 16, wherein said terminal identifier and said server identifier are the same.

19. A management facility of home-located electronic devices, comprising:
storing means for storing server identifiers and corresponding terminal identifiers;
means for receiving from a terminal a request signal that includes a terminal identifier identifying said terminal;
means for identifying a server, said server being identified by a server identifier obtained from said storing means based on said terminal identifier included with said request signal;
means for receiving status information and said server identifier, said status information indicative of the status of home-located electronic devices that are controlled by said server;
generating means for generating display information for a screen of said terminal based on the performance capability of said terminal, wherein said display information includes a status of said home-located electronic devices and a prompt for input of a control instruction to direct said home-located electronic devices;
means for transmitting said display information to said terminal;
means for generating second control information based on said first control information, wherein said home-located electronic devices are controllable by said server based on said second control information; and
means for transmitting said second control information to said server.

20. A management facility of home-located electronic devices according to claim 19, wherein said generating means generates said display information to be a web page that includes a link to a page of more detailed information.

21. A management facility of home-located electronic devices, comprising:
means for storing one or more sets of server identifiers and terminal identifiers;
means for receiving from a server a server identifier and an alarm, said server identifier identifying said server;
identifying means for identifying a terminal, said terminal being identified with a terminal identifier that corresponds to said server identifier, wherein said identifing means is configured to format said display information based on a stored capability of said terminal that includes at least one of a display capability or a communication capability of said terminal;
means for generating display information that is formatted to be displayed on a screen of said terminal, wherein said display information includes alarm notification and a prompt for input of a control instruction for said home-located electronic devices on the basis of said received alarm;
means for transmitting said display information to said terminal;
means for receiving from said terminal a terminal identifier and first control information that includes said control instruction;
means for generating second control information to direct said server to control said home-located electronic devices, on the basis of said first control information; and
means for transmitting said second control information to said server, said server being identified by said server identifier corresponding to said terminal identifier.

22. A method for remote control of home-located electronic devices, the method comprising:
a home network management system receiving over a network a request to access a plurality of home-located electronic devices coupled with a respective home network, wherein said request includes an identifier of a remote terminal that originated said request;
said home network management system determining at least one of the display capability or the communication capability of said remote terminal based on said identifier;
said home network management system formatting status data pertaining to said home-located electronic devices that is displayable on said remote terminal based on at least one of said determined display capability or said determined communication capability or combinations thereof, of said remote terminal; and
said home network management system transmitting said formatted status data for receipt and display by said remote terminal.

23. The method of claim 22, wherein receiving comprises said home network management system identifying a server within said home network that is in communication with said home network management system and said home-located electronic devices.

24. The method of claim 22, wherein receiving comprises said home network management system determining a server that corresponds to said identifier of said remote terminal, and requesting a status of said home-located electronic devices from said server.

25. The method of claim 22, wherein formatting comprises determining a predefined security level assigned to a user of said remote terminal and including in said status data only that status data identified as providable based on said predefined security level.

26. The method of claim 22, wherein said status information is storable with said home network management server as a table and the method further comprises said home network management system modifying said table in response to receipt of an instruction from said remote terminal to modify the status of at least one of said home-located electronic devices.

27. The method of claim 26, wherein modifying said table comprises generating a control instruction that is directed to at least one of said home-located electronic devices in response to said table modification; and transmitting said control signal for receipt by said home network.

28. The method of claim 22, wherein determining the display capability of said remote terminal comprises accessing a predetermined level of capability of said remote terminal stored in a database.

29. The method of claim 22, wherein said identifier is a manufacturer model identifier of said remote terminal.

30. The method of claim 22, wherein formatting comprises the initial step of requesting said status information from said home network in response to receipt of said request to access, and receiving said status information from said home network.

31. A management facility of home-located electronic devices, the system comprising:
a database;
a network server in communication with said database, wherein said network server is configured to access said database to determine at least one of the display capability or the communication capability of a remote terminal in response to a status request receivable from said remote terminal,
wherein said status request includes a remote terminal identifier and a request for status of at least one of a plurality of home-located electronic devices;
wherein said network server is configured to further access said database to determine a server identifier corresponding to said remote terminal identifier, said server identifier indicative of a home server in communication with said home-located electronic devices; and
a network management server in communication with said network server and configured to communicate with said home server, wherein said network management server is configured to retrieve a status of said home-located electronic devices based on said server identifier.

32. The system of claim 31, wherein said network server is configured to format display information indicative of said status in accordance with at least one of said display capability or said communication capability or combinations thereof, said display information to be transmitted for receipt and display by said remote terminal.

33. The system of claim 31, wherein said network server is configured to determine a predefined security level assigned to a user of said remote terminal and include in said status data only that status data identified as providable based on said predefined security level.

34. The system of claim 31, wherein said status information is storable in said database as a status information table, and modifications to the status information in said table are performable by said network server in response to receipt of an instruction from said remote terminal to modify the status of at least one of said home-located electronic devices.

35. The system of claim 34, wherein said network server is configured to generate a control instruction that is directed to at least one of said home-located electronic devices in response to a modification to said status information received from said remote terminal, said control instruction transmittable for receipt by said home server.

36. The system of claim 31, wherein said database includes indication of a predetermined level of capability of said remote terminal.

37. The system of claim 31, wherein said identifier is a manufacturer model identifier of said remote terminal.

38. The system of claim 31, wherein said network server is configured to request said status information from said home network in response to receipt of said status request, and further configured to receive said status information from said home network.

* * * * *